(12) United States Patent
Roberts

(10) Patent No.: US 10,207,606 B2
(45) Date of Patent: Feb. 19, 2019

(54) RECYCLABLE PLASTIC STRUCTURAL ARTICLES AND METHOD OF MANUFACTURE

(71) Applicant: Richard W. Roberts, Tecumseh, MI (US)

(72) Inventor: Richard W. Roberts, Tecumseh, MI (US)

(*) Notice: Subject to any disclaimer, the term of this patent is extended or adjusted under 35 U.S.C. 154(b) by 736 days.

(21) Appl. No.: 14/389,019

(22) PCT Filed: Mar. 28, 2013

(86) PCT No.: PCT/US2013/034312
§ 371 (c)(1),
(2) Date: Sep. 29, 2014

(87) PCT Pub. No.: WO2013/148977
PCT Pub. Date: Oct. 3, 2013

(65) Prior Publication Data
US 2015/0118426 A1 Apr. 30, 2015

Related U.S. Application Data

(63) Continuation-in-part of application No. 13/463,682, filed on May 3, 2012, now Pat. No. 9,073,462, and a
(Continued)

(51) Int. Cl.
| | |
|---|---|
| *B60N 2/427* | (2006.01) |
| *B29C 44/18* | (2006.01) |
| *B60N 2/70* | (2006.01) |
| *B29K 105/04* | (2006.01) |
| *B29K 101/12* | (2006.01) |
| *B29L 31/30* | (2006.01) |
| *B29L 31/00* | (2006.01) |

(52) U.S. Cl.
CPC .......... *B60N 2/42709* (2013.01); *B29C 44/18* (2013.01); *B60N 2/7017* (2013.01);
(Continued)

(58) Field of Classification Search
CPC ...... B60N 2/64; B60N 2/42709; B60N 2/427; B60N 2/90; B60N 2205/00; B29C 44/18;
(Continued)

(56) References Cited

U.S. PATENT DOCUMENTS

| 776,342 A | 11/1904 | McCormick |
|---|---|---|
| 1,588,778 A | 6/1926 | Sorensen |

(Continued)

FOREIGN PATENT DOCUMENTS

| EP | 0542302 | 5/1993 |
|---|---|---|
| EP | 0583542 | 2/1994 |

(Continued)

OTHER PUBLICATIONS

National Highway Traffic Safety Admin., DOT, 49 CFR Part 581, Undated.*

(Continued)

*Primary Examiner* — Milton Nelson, Jr.
(74) *Attorney, Agent, or Firm* — Brooks Kushman P.C.

(57) ABSTRACT

An in-situ molded foam core structural plastic article having an outer shell with an interior cavity filled with expandable polymer beads which when expanded substantially fill the interior cavity forming a thermal bond with the shell. The bead and shell are of a similar plastic composition enabling the articles to be reground and recycled. Various articles are disclosed including structural panels, and automotive seat, load floor, interior panel, bumper and running board components. An apparatus for forming the articles and an associated method of manufacture are also disclosed.

11 Claims, 35 Drawing Sheets

Related U.S. Application Data continuation-in-part of application No. 13/463,705, filed on May 3, 2012, now abandoned, and a continuation-in-part of application No. 13/463,700, filed on May 3, 2012, now Pat. No. 8,840,819, and a continuation-in-part of application No. 13/840,827, filed on Mar. 15, 2013, now Pat. No. 9,346,237.

(60) Provisional application No. 61/616,988, filed on Mar. 28, 2012, provisional application No. 61/616,985, filed on Mar. 28, 2012, provisional application No. 61/616,948, filed on Mar. 28, 2012.

(52) U.S. Cl.
CPC .... *B29K 2101/12* (2013.01); *B29K 2105/048* (2013.01); *B29L 2031/3017* (2013.01); *B29L 2031/3044* (2013.01); *B29L 2031/771* (2013.01); *B60N 2205/00* (2013.01); *Y10T 428/1372* (2015.01)

(58) Field of Classification Search
CPC .......... B29K 2105/048; B29K 2101/12; B29L 2031/771
USPC .......................... 297/DIG. 1, 216.13, 216.14
See application file for complete search history.

(56) References Cited

U.S. PATENT DOCUMENTS

| | | |
|---|---|---|
| 2,784,417 A | 3/1957 | Strand |
| 2,983,963 A | 5/1961 | Jodell et al. |
| 3,062,337 A | 11/1962 | Zittle |
| 3,111,787 A | 11/1963 | Chamberlain |
| 3,132,417 A | 5/1964 | Irwin |
| 3,277,220 A | 10/1966 | Plymale et al. |
| 3,389,195 A | 6/1968 | Gianakos et al. |
| 3,400,429 A | 9/1968 | Ludwig |
| 3,466,700 A | 9/1969 | Harrison |
| 3,468,097 A | 9/1969 | Mack |
| 3,563,845 A | 2/1971 | Stevens |
| 3,598,312 A | 8/1971 | Hamilton |
| 3,745,998 A | 7/1973 | Rose |
| 3,774,968 A | 11/1973 | Fenton |
| 3,813,040 A | 5/1974 | Heinemeyer |
| 3,935,044 A | 1/1976 | Daly |
| 4,361,656 A | 11/1982 | Mostafa |
| 4,492,663 A | 1/1985 | Reinfeld et al. |
| 4,546,899 A | 10/1985 | Williams |
| 4,573,741 A | 3/1986 | Kirchner-Carl |
| 4,621,002 A | 11/1986 | Kuhlmann et al. |
| 4,651,494 A | 3/1987 | Van Wagoner |
| 4,680,909 A | 7/1987 | Stewart |
| 4,762,438 A | 8/1988 | Dewing |
| 4,825,089 A | 4/1989 | Lindsay |
| 4,840,973 A | 6/1989 | Kuwabara et al. |
| 5,018,329 A | 5/1991 | Hasan et al. |
| 5,023,042 A | 6/1991 | Efferding |
| 5,028,377 A | 7/1991 | Hendry |
| 5,055,350 A | 10/1991 | Neefe |
| 5,093,053 A | 3/1992 | Eckardt et al. |
| 5,252,270 A | 10/1993 | Haardt et al. |
| 5,275,860 A | 1/1994 | D'Luzansky et al. |
| 5,306,266 A | 4/1994 | Freeland |
| 5,345,814 A | 9/1994 | Cur et al. |
| 5,366,674 A | 11/1994 | Hattori et al. |
| 5,505,810 A | 4/1996 | Kirby et al. |
| 5,532,034 A | 7/1996 | Kirby et al. |
| 5,665,285 A | 9/1997 | Hattori et al. |
| 5,711,073 A | 1/1998 | Tippmann et al. |
| 5,713,518 A | 2/1998 | Fox et al. |
| 5,759,459 A | 6/1998 | Eckardt et al. |
| 5,786,394 A | 7/1998 | Slaven |
| 5,824,261 A | 10/1998 | Berdan |
| 5,858,159 A | 1/1999 | Holbrook et al. |
| 5,866,224 A | 2/1999 | Ang et al. |
| 5,956,905 A | 9/1999 | Weidrich |
| 6,179,215 B1 | 1/2001 | Shea |
| 6,196,760 B1 | 3/2001 | Sinclair |
| 6,230,981 B1 | 5/2001 | Hill et al. |
| 6,241,926 B1 | 6/2001 | Cutler |
| 6,375,892 B2 | 4/2002 | Thomas |
| 6,605,343 B1 | 8/2003 | Motoi et al. |
| 6,607,680 B1 | 8/2003 | Moitzheim |
| 6,685,333 B1 | 2/2004 | Bieberdorf |
| 6,692,183 B2 | 2/2004 | Godfrey |
| 6,931,809 B1 | 8/2005 | Brown et al. |
| 6,938,968 B2 | 9/2005 | Tanimoto et al. |
| 6,955,576 B2 | 10/2005 | Yeh |
| 6,972,144 B2 | 12/2005 | Roth et al. |
| 7,201,112 B2 | 4/2007 | Jolley |
| 7,201,625 B2 | 4/2007 | Yeh |
| 7,219,479 B2 | 5/2007 | Durning et al. |
| 7,358,280 B2 | 4/2008 | Berghmans et al. |
| 7,377,828 B2 | 5/2008 | Cheung |
| 7,401,998 B2 | 7/2008 | Wilson et al. |
| 7,485,352 B2 | 2/2009 | Yuasa et al. |
| 7,537,413 B1 | 5/2009 | Brugos |
| 7,931,210 B1 | 4/2011 | Pike et al. |
| 7,950,592 B2 | 5/2011 | Yuan |
| 7,976,749 B2 | 7/2011 | Volkel et al. |
| 2001/0035658 A1 | 11/2001 | Anderson et al. |
| 2002/0124531 A1 | 9/2002 | Mossbeck et al. |
| 2003/0081999 A1 | 5/2003 | Godfrey |
| 2003/0181536 A1 | 9/2003 | Roth |
| 2003/0224675 A1 | 12/2003 | Yeh |
| 2004/0172964 A1 | 9/2004 | Brachert et al. |
| 2004/0176001 A1 | 9/2004 | Yeh |
| 2004/0232254 A1 | 11/2004 | Kowalski |
| 2005/0001048 A1 | 1/2005 | Skoblenick et al. |
| 2005/0101201 A1 | 5/2005 | Yeh |
| 2005/0188637 A1 | 9/2005 | Yeh |
| 2005/0215138 A1 | 9/2005 | Yeh |
| 2005/0272323 A1 | 12/2005 | Yeh |
| 2006/0003044 A1 | 1/2006 | Dinello et al. |
| 2006/0030467 A1 | 2/2006 | Mellott |
| 2006/0078382 A1 | 4/2006 | Wilson et al. |
| 2006/0105650 A1 | 5/2006 | Yeh |
| 2006/0110993 A1 | 5/2006 | Yeh |
| 2006/0131437 A1 | 6/2006 | Thiagarajan et al. |
| 2006/0134401 A1 | 6/2006 | Yeh |
| 2006/0223897 A1 | 10/2006 | Sasaki |
| 2007/0015421 A1 | 1/2007 | Yeh |
| 2007/0040293 A1 | 2/2007 | Lane et al. |
| 2007/0160798 A1 | 7/2007 | Yeh |
| 2008/0018161 A1 | 1/2008 | Evans |
| 2008/0081153 A1 | 4/2008 | Yeh |
| 2008/0083835 A1 | 4/2008 | Girardi et al. |
| 2008/0125502 A1 | 5/2008 | Reichman et al. |
| 2008/0142611 A1 | 6/2008 | Scobie |
| 2008/0166539 A1 | 7/2008 | Yeh |
| 2008/0242169 A1 | 10/2008 | Yeh |
| 2008/0305304 A1 | 12/2008 | Yeh |
| 2009/0011667 A1 | 1/2009 | Hayward et al. |
| 2009/0100780 A1 | 4/2009 | Mathis et al. |
| 2009/0133354 A1 | 5/2009 | Spear et al. |
| 2010/0028654 A1 | 2/2010 | Takase et al. |
| 2010/0116180 A1 | 5/2010 | Roth et al. |
| 2011/0115120 A1 | 5/2011 | Hattori et al. |
| 2012/0031912 A1 | 2/2012 | Wang |
| 2012/0102884 A1 | 5/2012 | Roberts, Jr. |
| 2012/0104110 A1 | 5/2012 | Roberts, Jr. |
| 2012/0240451 A1 | 9/2012 | Ricks |
| 2012/0328889 A1 | 12/2012 | Hayashi et al. |
| 2013/0140860 A1 | 6/2013 | Naughton et al. |

FOREIGN PATENT DOCUMENTS

| | | |
|---|---|---|
| EP | 0535147 | 9/1996 |
| EP | 1987934 | 11/2008 |
| JP | 58213028 | 12/1983 |
| JP | S59145125 | 8/1984 |
| JP | 59155443 | 9/1984 |
| JP | 59210954 | 11/1984 |
| JP | 60090744 | 5/1985 |

(56) References Cited

FOREIGN PATENT DOCUMENTS

| JP | 06166112 | 6/1994 |
| JP | 07195536 | 8/1995 |
| JP | 2010046920 | 3/2010 |
| WO | 9119867 | 12/1991 |
| WO | 2011103284 | 8/2011 |

OTHER PUBLICATIONS

GB Examination Report for GB 1308511.3, Completed by the GB Patent Office, dated Aug. 10, 2016, 5 Pages.
International Search Report for PCT/US2013/034312, Completed by the Korean Intellectual Property Office dated Jun. 26, 2013, 5 Pages.
Website www.jsp.com, 2006, "Arplank, Expanded bead foam packaging materials, Material Properties, Auto/Mil Specs." 21 Pages.
Website, Manning, www.mmh.com Oct. 2008, Retrived on Jan. 4, 2011, "Modern Materials Handling, Choosing Plastic." 2 Pages.
Website, Specter, www.mmh.com Sep. 2009, "Modern Materials Handling, The Rise of the Plastic Pallet." 4 Pages.
Vehicle Certification Agency Oct. 25, 2007, pp. 1-6, Test Report No. ESH178571, "Test Report: Seat Strength."
ECE Agreement Jul. 31, 2002, Regulation No. 17, "Concerning the adoption of uniform technical prescriptions for wheeled vehicles, equipment and parts which can be fitted and / or used on wheeled vehicles and the conditions for reciprocal recognition of approvals granted on the basis of these prescriptions."
Partial Supplementary European Search Report for European Application No. 13769879.1, Completed by the European Patent Office, dated Nov. 25, 2015, 9 Pages.

\* cited by examiner

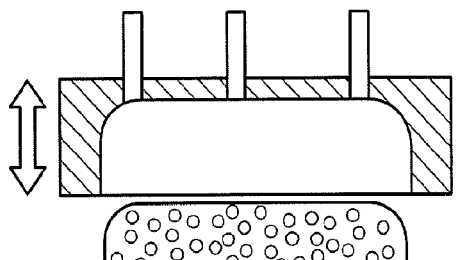
Fig. 15I
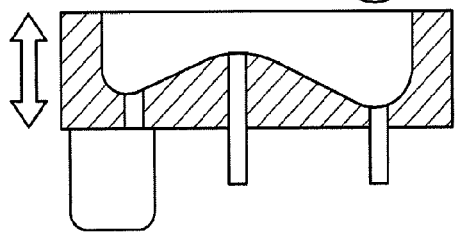
Fig. 15H
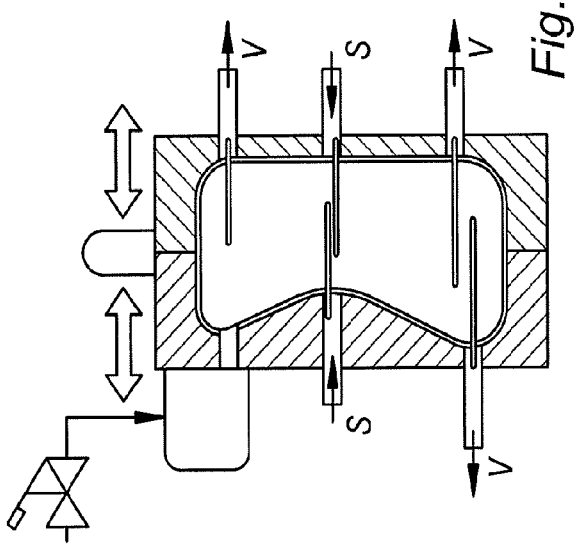
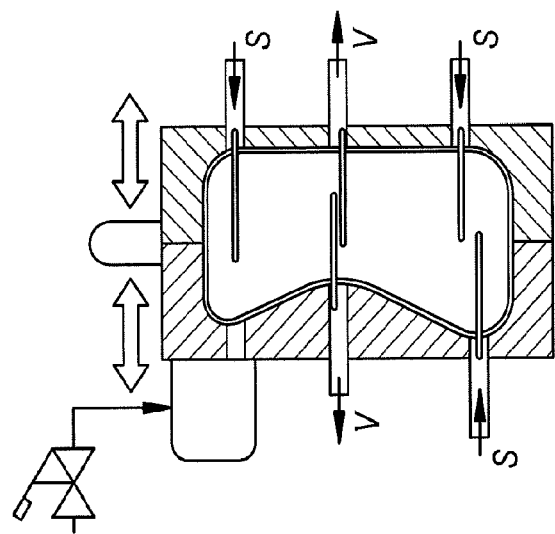
Fig. 15G

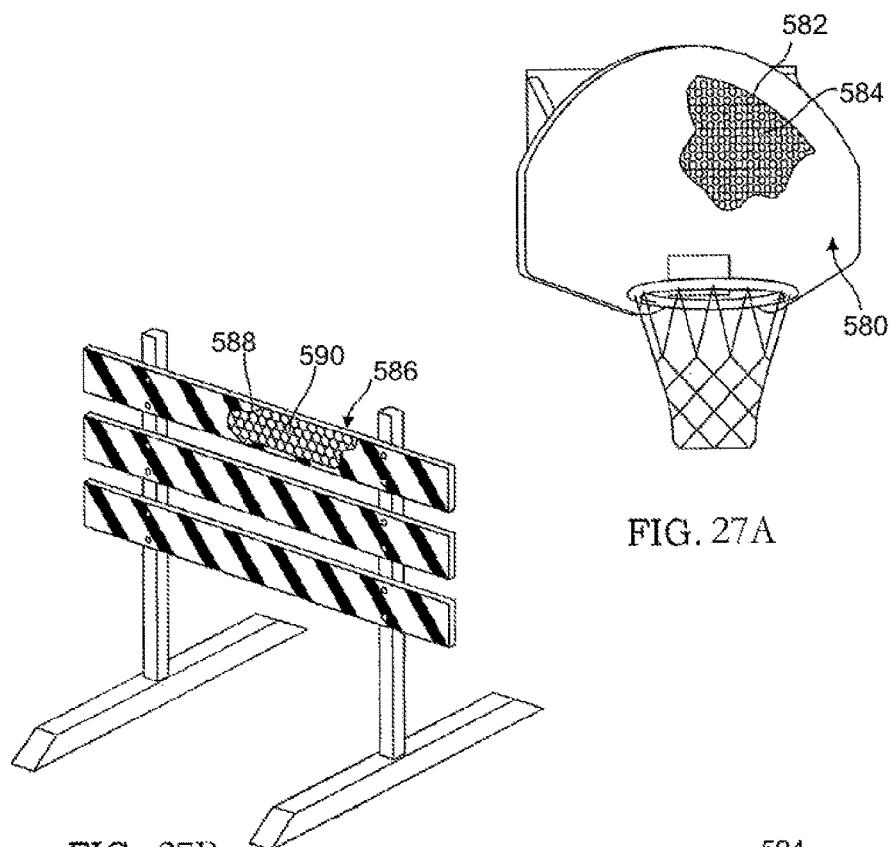
FIG. 27A
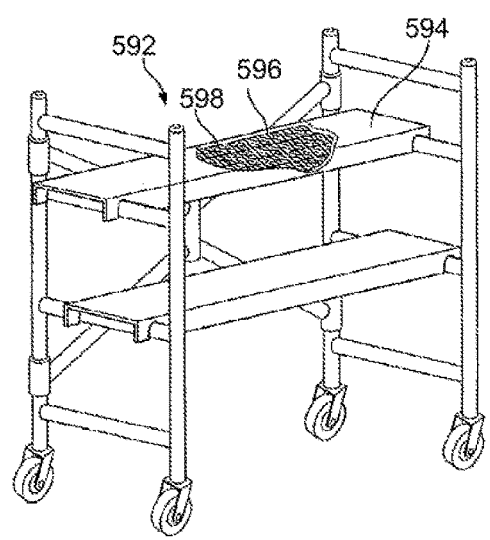
FIG. 27B
FIG. 27C

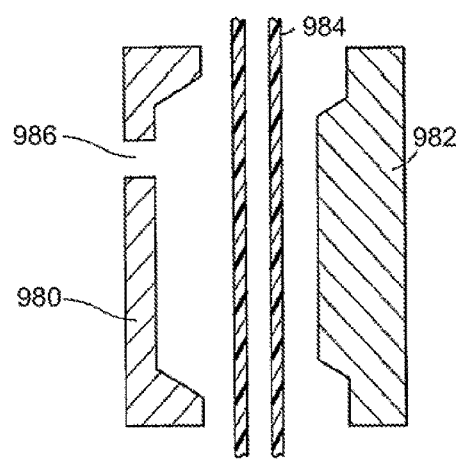
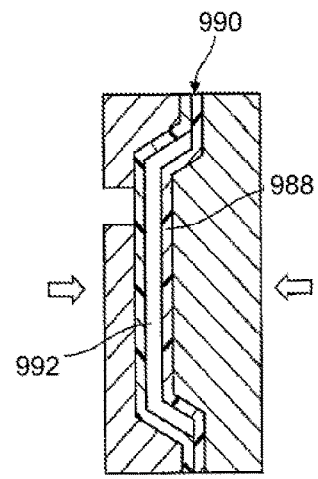
FIG. 37A    FIG. 37B
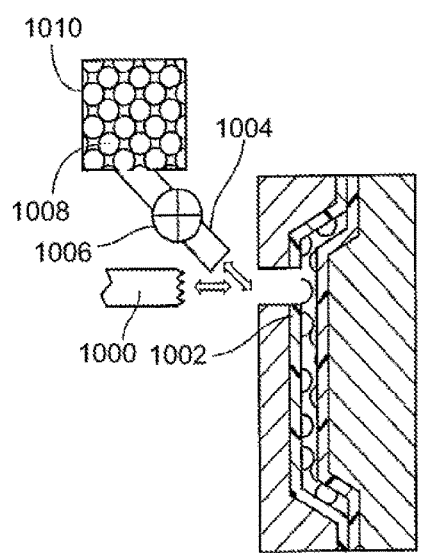
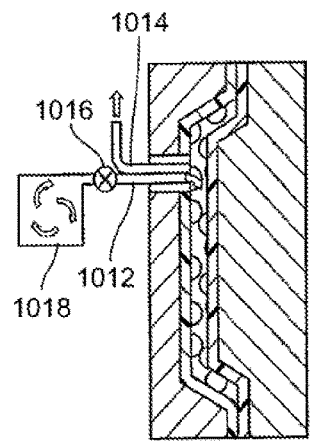
FIG. 37C    FIG. 37D

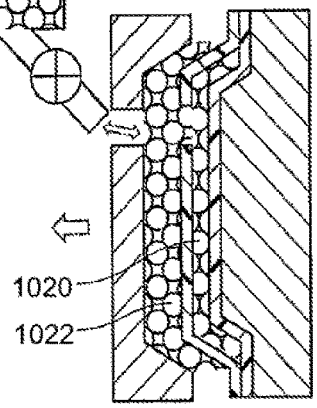
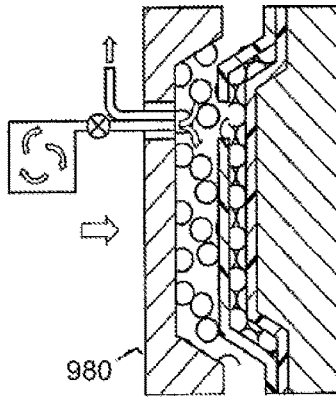
FIG. 37E  FIG. 37F
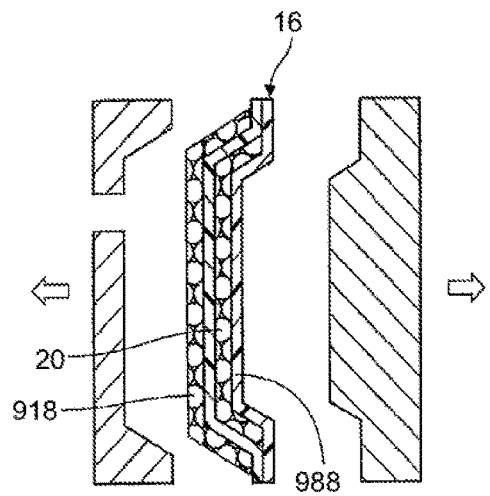
FIG. 37G

RECYCLABLE PLASTIC STRUCTURAL ARTICLES AND METHOD OF MANUFACTURE

CROSS-REFERENCE TO RELATED APPLICATION

This application is the U.S. national phase of PCT Application No. PCT/US2013/034312 filed on Mar. 28, 2013, which claims benefit of U.S. Provisional Application 61/616,988 filed Mar. 28, 2012; U.S. Provisional Application 61/616,985 filed Mar. 28, 2012; and U.S. Provisional Application 61/616,948 filed Mar. 28, 2012, and claims priority to U.S. application Ser. No. 13/463,682 filed May 3, 2012 now U.S. Pat. No. 9,073,462; U.S. application Ser. No. 13/463,705 filed May 3, 2012; U.S. application Ser. No. 13/463,700 filed May 3, 2014, now U.S. Pat. No. 8,840,819 and U.S. application Ser. No. 13/840,827 filed Mar. 15, 2013 now U.S. Pat. No. 9,346,237, the disclosures of which are incorporated in their entirety by reference herein.

TECHNICAL FIELD

The disclosed embodiments relate to an in-situ molded foam core structural plastic article, and a system and method of manufacturing of same.

BACKGROUND

Substitution of plastic compositions for structural articles formed from non-plastic materials may meet objections regarding relatively low physical properties of the substitute plastic composition. Manufacturers often blend the plastic composition with other resins and additives to improve the physical properties. But, the blends of resins and additives may decrease the recyclability of the plastic composition.

In one example of a structural article suitable for material substitution, railroad ties support relatively great weights of railroad locomotives and their attached train cars with their contents. As the trains pass over railroad rails supported on railroad ties, the ties experience substantial vibration, in addition to the compressive force of the weight. When the ties are not in use, they are still subjected to harsh environment extremes of temperature, ultraviolet light, and moisture. The degradation of wooden railroad ties through this exposure to the environment requires that the ties must be replaced frequently in order to continue to perform their primary function of supporting the weight of the train. The wood used to make conventional railroad ties is increasingly becoming more expensive. Wooden railroad ties are heavy making the job of replacing them difficult.

Panels, especially load-bearing panels are used in many applications. For example, vehicle manufacturers attempt to reduce the weight of the vehicles in order to enhance the fuel economy of the vehicle. Often, the reduction in weight compromises component part strength as wall thickness of blowmolded, thermoformed, rotocasted, and rotomolded components is reduced in order to a component reduce weight. For example, load floor systems have a relatively long span that is unsupported across the inside of the vehicle, in order to provide load-bearing characteristics. At the same time, plastic processors are consolidating components in load floor systems in order to reduce further the load floor weight and the assembly labor costs. In certain instances, plastic processors have incorporated glass fiber reinforcements into the plastic material used to make load floors. But, these reinforcements and fillings may also render the load floor system component brittle and not suitable for all the characteristics of load floor systems designs. Recently, plastic processors have incorporated cone tack-offs to provide stiffening for vehicle load floor systems in order to compensate for component part strength reduction. But, cone tack-offs produce witness marks that damage aesthetic properties of a show surface. It is desirable to consolidate components in load floor systems while at the same time eliminating cone tack-offs.

In at least one embodiment, a panel system includes a first panel having a periphery. The panel includes a first plastic layer having a periphery and a second plastic layer opposed and spaced apart from the first layer. The second layer also has a periphery. The first and second layers define a first cavity therebetween. A first in-situ foam core is disposed in the cavity and has a thermal bond to the first and second plastic layers. The panel is capable of supporting 0.1 to 0.5 $lbf/in^2$.

Vehicle manufacturers attempt to reduce the weight of the vehicles in order to enhance the fuel economy of the vehicle. Often the reduction in weight compromises the strength of component parts. Recently, regulations, such as ECE17 and Federal Motor Vehicle Safety Standards (FMVSS), such as FMVSS202A, have mandated a stiffer component structure for vehicle seats and greater energy absorption for associated seat headrests.

Recent components such as seat backs comprising a plastic blend of polycarbonate and acrylonitrile butadiene styrene (PC/ABS) have increased the cost of seat backs as well as increased the weight of the blowmolded polyethylene seat backs that they replaced. In other situations, headrests formed of polyurethanes foam failed the vertical height volumetric compression test as well as the deformation retention test.

SUMMARY

Disclosed embodiments relate to recyclable plastic structural articles and methods of manufacture of same. In at least one embodiment, a plastic structural article includes an elongated tubular shell having opposed end sections, a middle section therebetween and an interior cavity. The article also includes a foam core comprised of steam expandable polymer beads which when expanded substantially fill the interior cavity.

The article in another embodiment, includes a railroad tie having an elongated shell including opposed closed end sections and a middle section therebetween. The shell defines an elongate interior cavity. Substantially filling the cavity is a foam core comprising expanded polyolefin beads.

In yet another embodiment, a method of manufacturing a plastic structural article includes blow-molding a plastic preform in a mold cavity in the shape of an elongated member to form an elongated tubular plastic shell. The shell has opposed end sections, a middle section therebetween and a hollow interior cavity. The method also includes forming at least one fill port and a plurality of heating ports in the wall of the plastic shell. The shell interior cavity is filled with expandable polymer beads. The polymer beads are expanded by injecting a hot, at least partially vaporized, heating medium into the heating ports. The polymer beads expand so as to substantially fill the interior cavity of the shell. The plastic shell is constrained to limit expansion of the shell caused by the heated expanding polymer beads until the assembly is sufficiently cooled to limit substantial further expansion. The mold cavity is opened releasing the plastic structural article.

In at least one embodiment, a seating system for use with a vehicle includes a first seat component having a skin having a thermal bond to an in-situ foam core. The first seat component maximum displacement is less than 160 mm when tested according to a test method in ECE R17 regulation for luggage retention with a 20 times the force of gravity crash pulse.

In another embodiment, a seating system for use with a vehicle includes a first and a second seat back component portion having a skin having a thermal bond to an in-situ foam core and a periphery. The first seat back component portion and the second seat back portion component are disposed about a frame.

In at least one embodiment, an energy management system for use with a vehicle having an interior includes an elongated plastic member having a wall defining a cavity. Disposed within the cavity is an elongated first in-situ foam core member, which has a first thermal bond to the wall. The wall having a first portion facing towards the vehicle interior and a second portion opposed to the first portion. A second in-situ foam core member is connected to at least a portion of the elongated plastic member forming the energy management system. The energy management system is capable of passing a 5-mph crash test passing Federal Motor Vehicle Safety Standard 215 (FMVSS 215) Phase II.

In another embodiment, an energy management system for use with a vehicle includes an elongated plastic member having a wall defining a cavity and a first in-situ foam core member disposed within the cavity. The first in-situ foam core has a first thermal bond to the wall. The thermal bond includes a cooled connection of a molten or a softened portion the wall, a molten or a softened portion of the first in-situ foam core, and a layer including portions of the wall and the first in-situ foam core. A second in-situ foam core member is connected to at least a portion of the elongated plastic member by a second thermal bond disposed between the wall and the second in-situ foam core. The energy management system is capable of meeting the requirements of 49 CFR Part 581.5 when measured according to 49 CFR Part 581.6 and 581.7.

In another embodiment, a method of manufacture of an energy management system includes the steps of spacing a first mold portion and a second mold portion about a polymeric parison, where the first mold portion has a port. The method includes pinching the polymer parison when closing the first and second mold portions about the polymer parison. Air is injected into the pinched parison forming a wall and a cavity from the polymer parison. An aperture is drilled into the wall through the port. A first plurality of beads is dispensed into the cavity through the aperture. Steam is injected into the first plurality of beads causing expansion of the first plurality of beads to form a first in-situ foam core having a thermal bond to the wall, thereby forming a structural plastic beam. The first mold portion is separated from the structural plastic beam. A second plurality of beads is dispensed between the first mold portion and the structural plastic beam. The first mold portion is closed again. Steam is injected into the second plurality of beads causing expansion of the second plurality of beads to form a second in-situ foam core having a second thermal bond to the structural plastic beam forming an the energy management system.

Energy management of relatively high input conditions is crucial. For example, vehicle manufacturers attempt to reduce the weight of the vehicles in order to enhance the fuel economy of the vehicles. Often, the reduction in weight compromises component part strength. For example, bumper systems have a relatively long span that is unsupported across the front of the vehicle between vehicle frame members. Traditionally, vehicle manufacturers have used a steel beam to provide the structural support. At the same time, bumper systems must minimize damage over that long span in a 5 mph crash test. Meeting that requirement often means that desired weight reductions are not possible. Recently, vehicle manufacturers have applied energy absorbing materials and product configurations to the steel beam to allow reduction in the thickness of the steel. However steel beams are still relatively heavy even when this steel has been thinned to the minimum necessary.

BRIEF DESCRIPTION OF THE DRAWINGS

FIGS. 15a-15i schematically illustrate a more detailed process of the manufacture of a foam filled blow molded article;

FIGS. 27A27C schematically illustrate isometric views of panels according to yet another embodiment.

FIGS. 37A-G schematically illustrate fragmentary cross-sectional views of a method of manufacture of a structural bumper system according to at least one embodiment.

DETAILED DESCRIPTION

Figure 1:
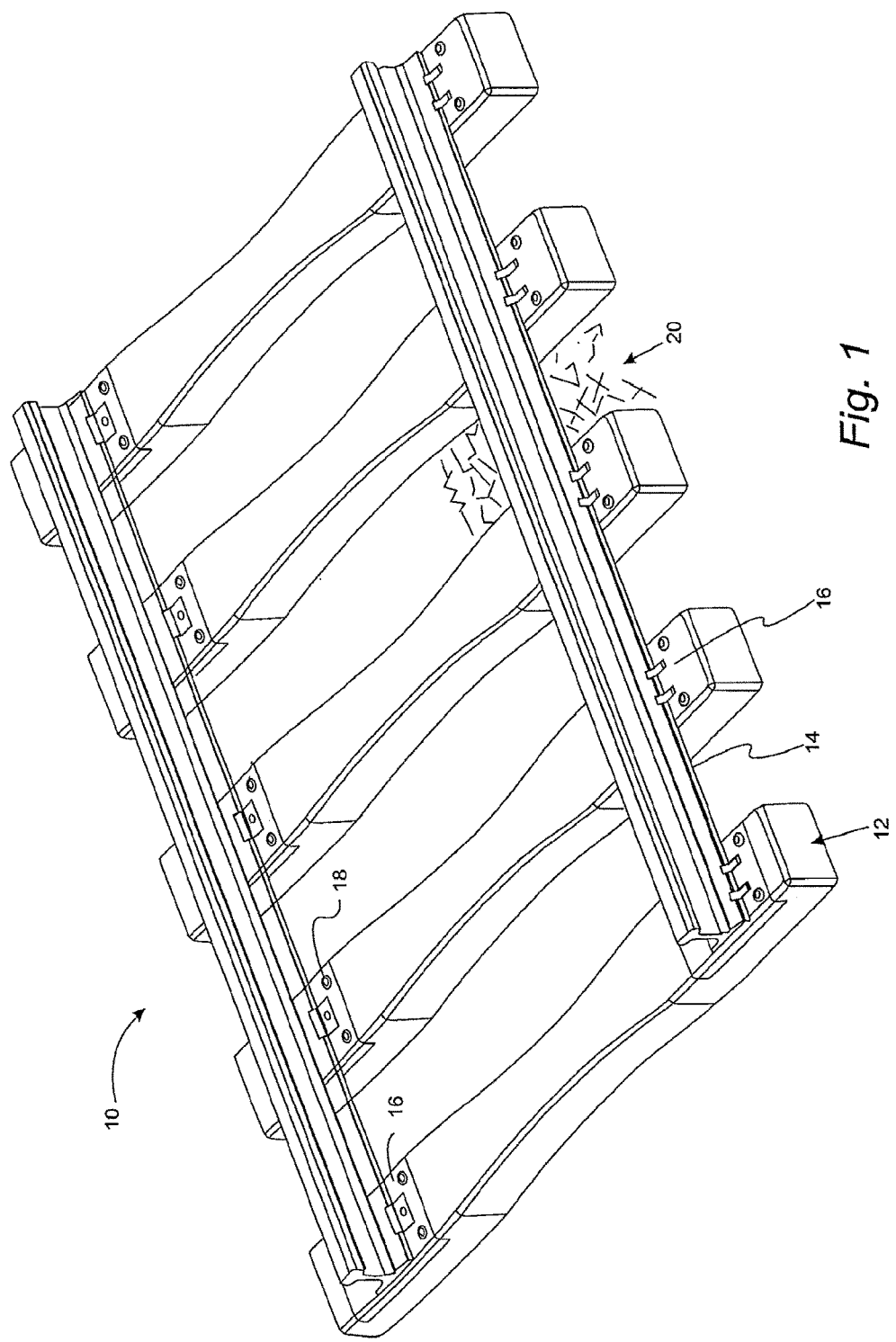
FIG. 1 schematically illustrates a fragmentary isometric view of a rail pattern according to at least one embodiment.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Except where expressly indicated, all numerical quantities in the description and claims, indicated amounts of material or conditions of reaction and/or use are to be understood as modified by the word "about" in describing the broadest scope of the present invention. Practice within the numerical limits stated should be desired and independently embodied. Ranges of numerical limits may be independently selected from data provided in the tables and description. The description of the group or class of materials as suitable for the purpose in connection with the present invention implies that the mixtures of any two or more of the members of the group or classes are suitable. The description of constituents in chemical terms refers to the constituents at the time of addition to any combination specified in the description and does not necessarily preclude chemical interaction among constituents of the mixture once mixed. The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same techniques previously or later referenced for the same property. Also, unless expressly stated to the contrary, percentage, "parts of," and ratio values are by weight, and the term "polymer" includes "oligomer," "co-polymer," "ter-polymer," "pre-polymer," and the like.

It is also to be understood that the invention is not limited to specific embodiments and methods described below, as specific composite components and/or conditions to make, of course, vary. Furthermore, the terminology used herein is used only for the purpose of describing particular embodiments of the present invention and is not intended to be limiting in any way.

It must also be noted that, as used in the specification and the pending claims, the singular form "a," "an," and "the," comprise plural reference unless the context clearly indicates otherwise. For example, the reference to a component in the singular is intended to comprise a plurality of components.

Throughout this application, where publications are referenced, the disclosure of these publications in their entirety are hereby incorporated by reference into this application to more fully describe the state-of-art to which the invention pertains.

Regarding FIG. 1, a section of railroad track is shown having a rail pattern 10 comprising two lengths of a railroad rail 14 that supports a maximum length of a span of a railroad car or locomotive from truck to truck. In at least one embodiment, rail pattern 10 comprises 5 to 50 railroad ties 12. In another embodiment, rail pattern 10 comprises 20 to 35 railroad ties 12. In yet another embodiment, rail pattern 10 comprises 25 to 32 railroad ties 12.

In at least one embodiment, rail pattern 10 includes railroad ties 12 situated on a rail bed 20. Ties 12 support at least two rails 14 which are parallel and spaced apart. Rail 14 is connected to railroad tie 12 with a plate 16 connected to rail 14. Plate 16 is fastened to railroad tie 12 by one or more spikes 18.

Figure 2:
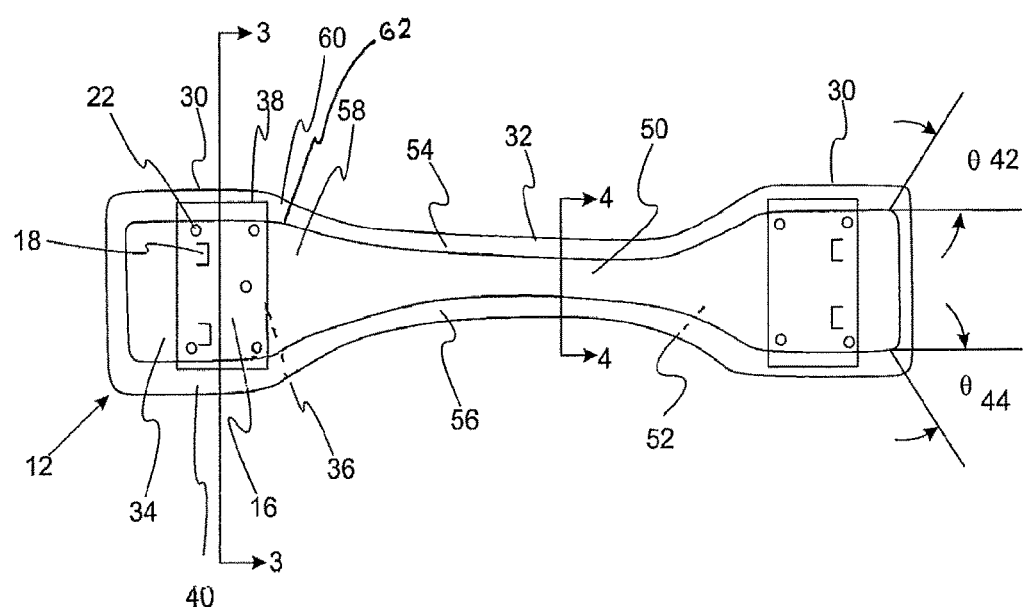
FIG. 2 schematically illustrates a railroad tie according to at least one embodiment.
Figure 3:
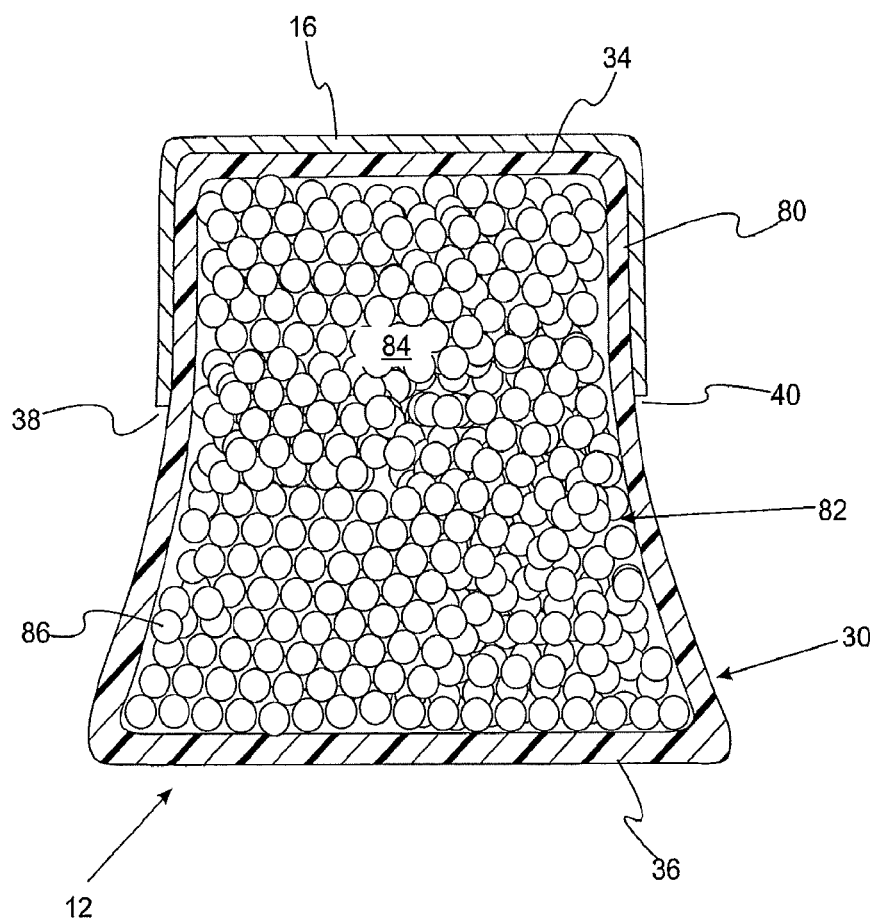
FIG. 3 schematically illustrates a cross-sectional view of a railroad tie along axis 3-3 in FIG. 2.

Turning now to FIG. 2, an embodiment of railroad tie 12 is schematically illustrated. Railroad tie 12 has two end sections 30 and a middle section 32. End section 30 includes a top surface 34 to which plate 16 is fastened. Opposed and parallel to top surface 34 is bottom surface 36 which is in contact with rail bed 20. Connecting top surface 34 and bottom surface 36 are two sides 38 and 40. An angle 42 between side 38 and top surface 34 may be perpendicular or range from 60° to 120°. An angle 44 between side 40 and surface 34 may also be perpendicular or, in another embodiment, range from 60° to 120°. Sides 38 and 40 may be linear, or curvilinear as illustrated in FIG. 3.

The height of the railroad tie 12 between top and bottom surfaces 34 and 36 may range from 4 inches to 16 inches in various embodiments. The width between sides 38 and 40 may range from 4 inches to 16 inches in different embodiments. The width between sides 38 and 40 may be effective to create a short column.

Figure 4:
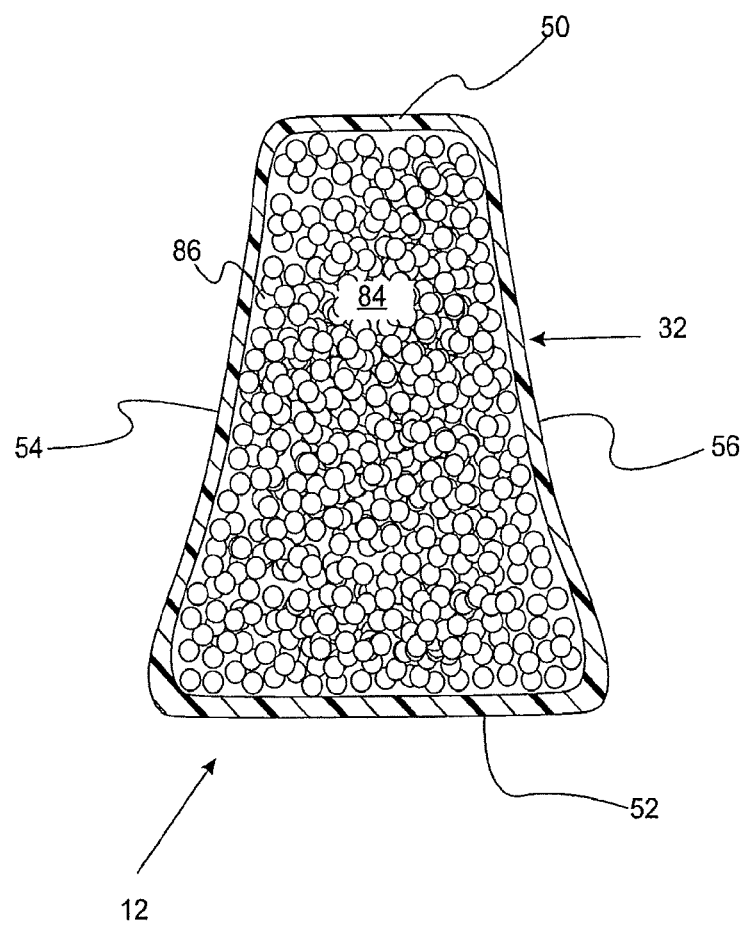
FIG. 4 schematically illustrates a cross-sectional view of a railroad tie along axis 4-4 in FIG. 2.

Middle section 32 includes a top surface 50 and a bottom surface 52 opposed and spaced apart from top surface 50. Connecting top surface 50 and bottom surface 52 are sides 54 and 56. Sides 54 and 56 may be linear, or curvilinear such as convex or concave, as illustrated in FIG. 4.

A transition 58 between the top surface 34 of end section 30 and top surface 50 of middle section 32 may be linear or curvilinear. A transition 60 between either sides 38 and 54 or sides 40 and 56 of the end section 30 and the middle section 50 may be linear or curvilinear. In at least one embodiment, the intersection of transitions 58 and 60 forms a Coons corner geometry 62.

Turning now to FIG. 3, a cross-sectional view of the end section 30 of railroad tie 12 along axis 3-3 of FIG. 2 is schematically illustrated. Wall 80, which includes outer periphery top and bottom surfaces 34 and 36, as well as sides 38 and 40, defines an interior cavity 82 into which a core 84 is formed. Wall 80 may be formed from a polymeric composition. The polymeric composition may include thermoplastic and/or thermoset polymers. In at least one embodiment, the polymeric composition is recyclable. Non-limiting examples of polymeric compositions suitable for wall 80 include polyolefins, such as polypropylene and polyethylene.

In certain embodiments, especially when the plastic standard articles are exported to cold environment, wall 80 includes a blow moldable thermoplastic polyolefin/polypropylene blend, a thermoplastic elastomer/polypropylene blend interpenetrating polyolefin blend, a thermoplastic having a glass transition temperature less than $-80°$ C./polyolefin blend, a hetergeneous polymer blend, and a thermoplastic having a glass transition temperature less than $-20°$ C./polyolefin blend, a thermoplastic vulcanizate/polyolefin blend. In certain embodiments, hetergeneous polymer blends having a crystalline thermoplastic phase and a high molecular weight or crosslinked elastomeric phase may be supplied by Exxon Mobile or Advanced Elastomer Systems.

In at least one embodiment, the ratio of thermoplastic polymer to polyolefin ranges from 5 wt. % to 70 wt. % of the blend. In another embodiment, the ratio of thermoplastic polymer to polyolefin ranges from 10 wt. % to 40 wt. %.

The thickness of wall 80 may range from 0.03 inches to 0.5 inches in at least one embodiment. In another embodiment, the thickness of wall 80 may range from 0.125 inches to 0.25 inches. In the illustrated embodiment, the wall is made of an elongated tube of polypropylene material having a wall thickness ranging from 0.14 inches to 0.17 inches before shrinkage which is blow-molded into the shape of the tie 12 having a finished wall thickness ranging from 0.13 to 0.16 inches.

Core 84 may include steam-expandable polymer particles 86, such as expanded polyolefin polymer beads. In at least one embodiment, the expanded polyolefin polymer beads includes expanded polypropylene polymer beads (EPP). In yet another embodiment, core 84 includes expanded high molecular weight polypropylene polymer beads. In yet another embodiment, homopolymer beads are included in the expanded polyolefin beads in order to increase the stiffness of core 84. As a non-limiting example, when the homopolymer polyolefin is a homopolymer polypropylene, the stiffness increases such that a 100,000 lb load yields a 5.8% strain and a compression of only 0.007 inches. In another example, the strain ranges from 2% strain to 10% strain. In at least one embodiment, EPP may be formed in situ by injection of steam into polypropylene beads to form steam-injected expanded polypropylene. It is understood that a portion of core 84 may comprise polyolefin beads in an unexpanded configuration or a partially expanded configuration.

Steam-injected expanded polypropylene may have a density ranging from 1 lb/ft$^3$ to 20 lbs/ft$^3$. In yet another embodiment, steam-injected EPP may have a density ranging from 1.5 lbs/ft$^3$ to 10 lbs/ft$^3$. In yet another embodiment, steam-injected EPP may have a density ranging from 2 lbs/ft$^3$ to 6 lbs/ft$^3$. In yet another embodiment, steam-injected EPP may have a density ranging from 3 lbs/ft$^3$ to 5 lbs/ft$^3$.

A load applied by a train may be more broadly distributed throughout core 84 by wrapping plate 16 around the sides 38 and 40 as shown in FIG. 3. Plate 16 forms an inverted "U" shape in order to support sides 38 and 40 and limits outward defection under load.

In FIG. 4, middle section 34 of railroad tie 12, in certain embodiments, includes a cavity 84 which is filled with expanded polyolefin. The expanded polyolefin particles 86 filling cavity may have a density that is less than, equal to, or greater than the density of expanded polyolefin in cavity 84 of end section 30. In another embodiment, end section 30 has a density of EPP that is at least 1 lb/ft$^3$ less than the density of EPP in middle section 34. While FIGS. 3 and 4 describe having 3 density zones, it is understood that railroad tie 12 may have one or more density zones without exceeding the scope or spirit of the embodiment. Further, it is understood that, in certain embodiments, the density zones may comprise a relatively uniform gradient of density throughout portions of the railroad tie 12 without relatively clear demarcation of one or more density zones. In the illustrated embodiment, the density of the EPP beads in the end section is 5 lbs/ft$^3$ while the density of the EPP beads in the middle section is 3 lbs/ft$^3$.

Figure 5:
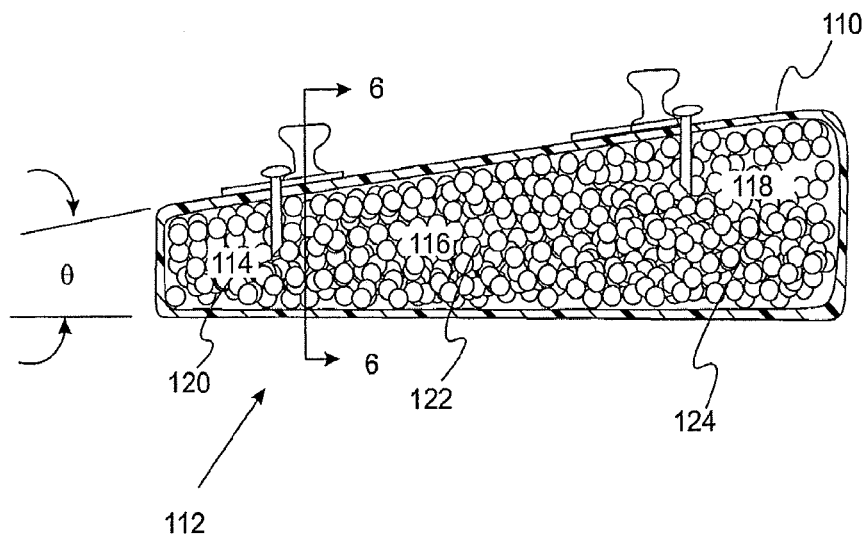
FIG. 5 schematically illustrates a cross-sectional view of a second railroad tie embodiment.

Turning now to FIG. 5, in at least one embodiment an angled railroad tie 112 suitable for use in a curved railroad pattern is schematically illustrated in cross-sectional view. Angled railroad tie 112 is formed from an angular wall section 110 which defines three sub-cavities 114, 116 and 118. Into cavity 114, a first expanded polyolefin 120 is formed. Into sub-cavity 116, a second expanded polyolefin 122 having a density less than expanded polyolefin 120 is formed. Into cavity 118, a third expanded polyolefin 124 having a third density is formed. In other embodiments, the densities of expanded polyolefins 120, 122 and 124 may be equal or different.

The angle of angled railroad tie 112 is given by angle θ. Angle θ is determined by a camber needed for safe passage of a train in a curve in the rail track pattern 10. It is desirable to have angled railroad tie 112 because rail bed 20 may be uniformly prepared as a flat and level bed surface. In at least one embodiment, the angle θ may range from 0.1° to 30°. In another embodiment, the angle θ may range from 0.5° to 10°. In yet another embodiment, the angled railroad tie comprises a wedge shape.

Figure 6:
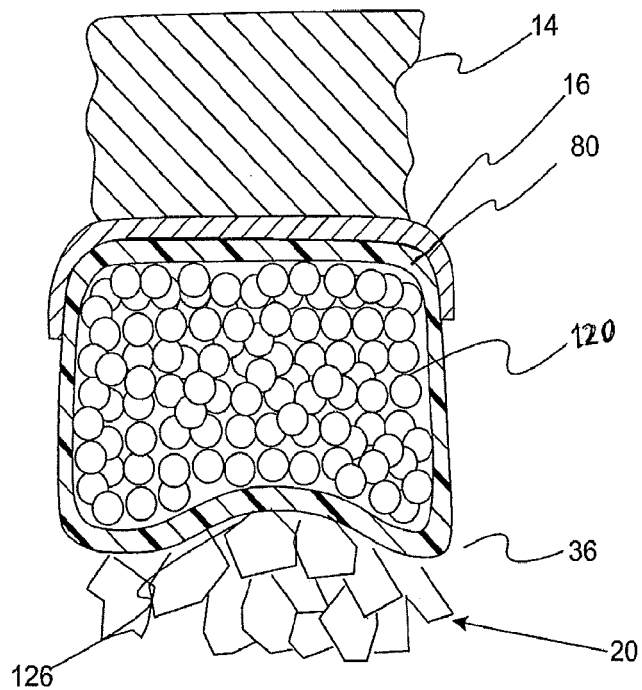
FIG. 6 schematically illustrates a fragmentary cross-sectional view of a railroad tie along axis 6-6 in FIG. 5.

Turning now to FIG. 6, a transverse, cross-sectional view along axis 6-6 of FIG. 5 is illustrated. Bottom surface 36, in at least one embodiment, includes a retention structure 126 which interacts with rail bed 20 to form an interference that reduces the tendency of the railroad tie 112 to move when a directional force is applied to railroad tie 112 by the passage of a train.

Figure 7:
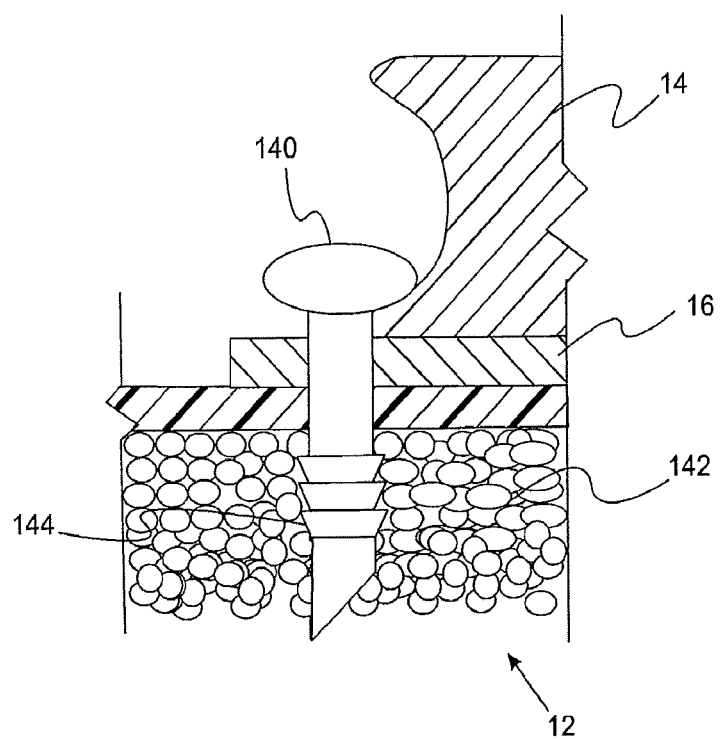
FIG. 7 schematically illustrates a fragmentary longitudinal, cross-sectional view of a railroad tie and rail system illustrating spike placement.

FIG. 7 illustrates a ringed shank fastener 140, such as a spike for use with railroad tie 12. The expanded polyolefin 142 moves aside as the ringed shank spike 140 is driven into railroad tie 12 in at least one embodiment. The expanded polyolefin 142 then rebounds to wrap around the ring shanks 144 of the spike 140 to secure the rail 14 and plate 16 to railroad tie 12.

In at least one embodiment ring shank 144 extends 0.100 inches to 0.300 inches from the root of spike 140. Ring shank 144 is configured as an inverted frustro conical section. Spike 140 may include a plurality of such frustro conical sections sequentially configured along the longitudinal axis of spike 140. It is understood that other shapes providing an undercut may be suitable for use with spike 140.

Figure 8:
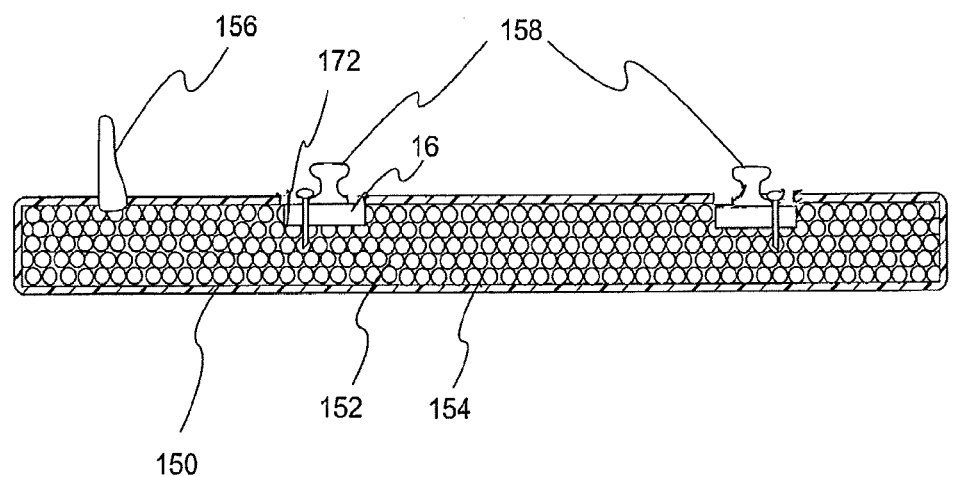
FIG. 8 schematically illustrates a cross-sectional view of a third rail configuration with a railroad tie.

FIG. 8 illustrates a third rail configuration for use with a railroad tie 150 according to at least one embodiment. Railroad tie 150 includes an expandable polyolefin 152 in a cavity defined by wall 154. A third rail device 156 is mounted on railroad tie 150. Third rail device 156 is electrified to supply power to an electrical train. Electrical power is then transferred to rails 158 back to the power station.

In addition, FIG. 8 illustrates having plate 16 inset into a plate retention structure 172 embossed into tie 150. It is understood that retention structure 126 and plate retention structure 172 may be present in the same railroad tie.

Figure 9:
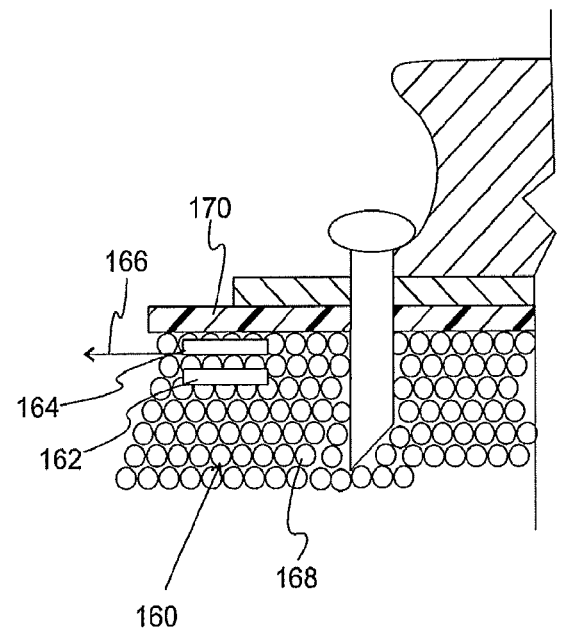
FIG. 9 schematically illustrates a fragmentary cross-sectional view of a railroad tie with load sensors.

FIG. 9 illustrates a fragmentary cross-section of a railroad tie 160 in which sensors are embedded according to at least one embodiment. One or more sensors, such as a RFID chip 162 with a piezoelectric strain gauge 164, may be embedded in an expanded polyolefin 168 in a cavity defined by wall 170. An optional conduit 166 may permit electrical connection of sensor 164 to an external signaling device. Sensors 162 and/or 164 may be introduced into the expanded polyolefin 168 prior to injection of the steam to expand the polyolefin beads. In another embodiment, the sensors may be place in the railroad tie 160 after demolding of the railroad tie by mechanical insertion means known in the art.

A typical railroad tie 12, in at least one embodiment, has a weight ranging from 10 lbs. to 200 lbs. for a 9 inch by 7 inch by 102 inch railroad tie. In another embodiment, railroad tie 12 has a weight ranging from 20 lbs. to 100 lbs. In yet another embodiment, railroad tie 12 has a weight ranging from 30 lbs. to 75 lbs so that the tie can be carried by a single worker.

When railroad pattern 10 uses railroad tie 12, the expanded polyolefin core functions as an energy absorber. In at least one embodiment, railroad tie 12, when using expanded polypropylene as the core, experiences a deflection before permanent set in excess of 25%.

The force needed to deflect the railroad tie may be characterized by a spring rate which is a function of a cross-sectional area bending moment of the railroad tie 12, a length of the railroad tie 12 and an elastic modulus of the expanded polyolefin. Having a higher spring rate than wood, the expanded polyolefin in the railroad tie 12 may have a greater yield stress than wood. Having greater yield stress may result in the expanded polyolefin railroad tie having greater energy absorption than the wood railroad ties. Increased energy absorption by the expanded polyolefin-based railroad ties may result in a relatively quiet railroad system when the train passes over the expanded polyolefin-based railroad ties.

The spring rate of the railroad tie may be increased or decreased by increasing or decreasing the density of the expanded polyolefin in the railroad tie core by use of methods disclosed in certain embodiments herein.

Polyolefin beads and methods of manufacture of unexpanded polyolefin beads suitable for making the illustrated embodiment are described in Japanese patents JP60090744, JP59210954, JP59155443, JP58213028, and U.S. Pat. No. 4,840,973, all of which are incorporated herein by reference. Non-limiting examples of expanded polyolefins are ARPLANK® and ARPRO® available from JSP, Inc. (Madison Heights, Mich.). Alternatively expanded polystyrene of polyethylene bead can be used but polypropylene is preferred for the railroad tie application.

The expanded polypropylene, such as the JSP ARPRO$^{TS}$ EPP, which has no external shell, exhibits physical properties such as in Table 1.

TABLE 1

| Property | Test Method | Units | Value | | | | | |
| --- | --- | --- | --- | --- | --- | --- | --- | --- |
| Density | ASTM D-3575 | lbs/ft$^3$ | 1.0 | 2.8 | 3.7 | 4.2 | 4.6 | 5.0 |
| Compressive Strength | ASTM D-3575 | lbf/in$^2$ | | | | | | |
| @ 10% deflection | | | 8.4 | 32 | 44 | 53 | 61 | 68 |
| @ 25% deflection | | | 11 | 42 | 57 | 65 | 76 | 84 |
| @ 50% deflection | | | 19 | 54 | 73 | 84 | 97 | 112 |
| @ 75% deflection | | | 41 | 111 | 155 | 183 | 220 | 251 |
| Compressive Set | ASTM D-3575 | % | | | | | | |
| @ 25% deflection | | | 8 | 7 | 7 | 7 | 7 | 7 |
| @ 50%deflection | | | 16 | 12 | 12 | 12 | 12 | 12 |
| Compressive Creep | ASTM D-3575 | % | <0.5 | 1 | 1.5 | 2.5 | 3.0 | 3.5 |
| @ 1000 hr | | | | | | | | |
| Service Temperature | ASTM D-3575 | ° C. | 100 | 100 | 100 | 100 | 100 | 100 |

Figure 10:
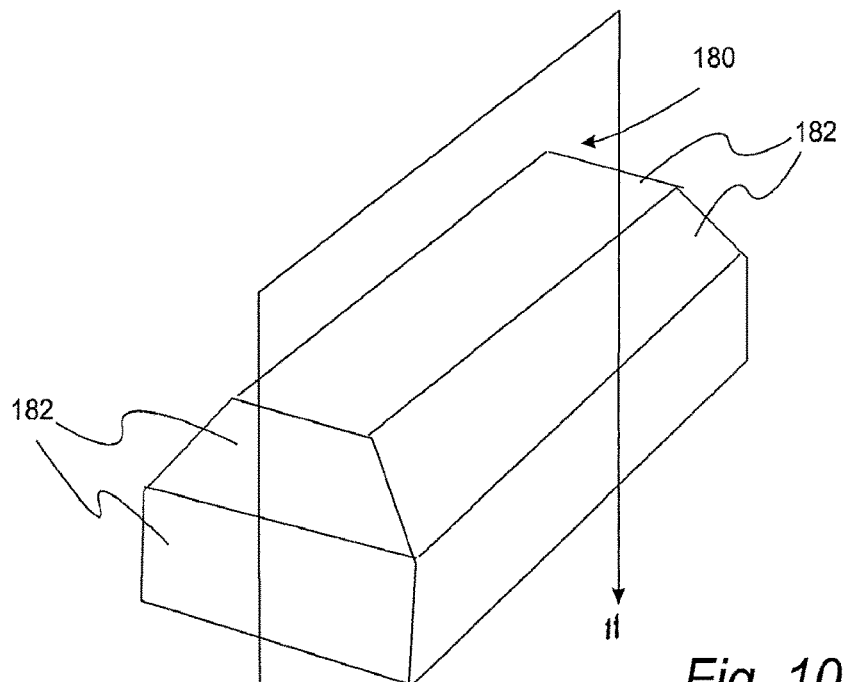
FIG. 10 schematically illustrates a bumper according to at least one embodiment.
Figure 11:
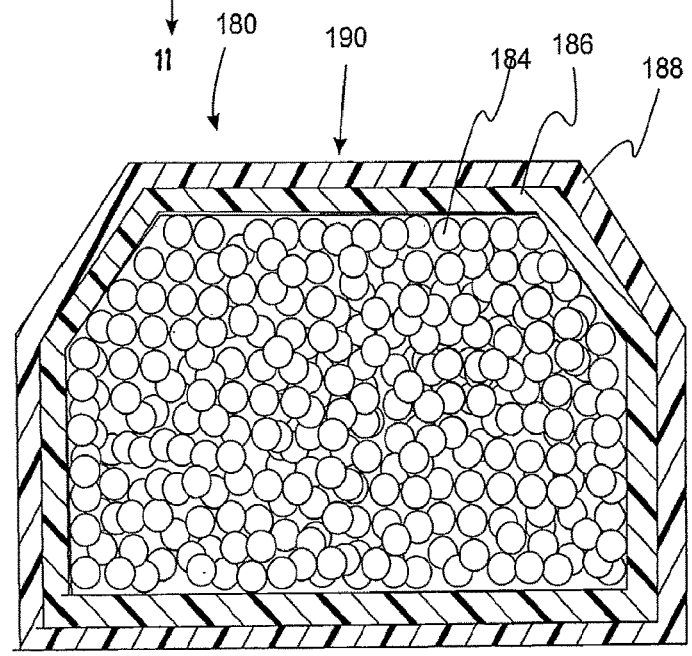
FIG. 11 schematically illustrates a cross-sectional view along axis 11-11 of FIG. 10.

Turning now to FIGS. 10 and 11, an embodiment of a bumper 180, such as the bumper suitable for a large truck chock block, a parking lot bumper, a dock bumper, a golf cart bumper, a roof for a low-speed vehicle, or ship fenders is schematically illustrated in isometric view in FIG. 10. Bumper 180 has an elongated tubular shape with one or more facets 182. The roof for the low-speed vehicle may range in thickness from 0.25 inches to 2 inches, preferable 0.75 inches to 1.25 inches.

In FIG. 11, a longitudinal cross-sectional view along axis 11-11 of FIG. 10 is schematically illustrated. The core 184 has a substantially uniform density of steam-expanded polypropylene beads throughout the entire profile of the elongated bumper 180. A pair of through holes 181 extend through the bumper to enable the bumper to be attached to the parking lot surface. Holes 181 can be formed by a large steam pins, while smaller blind holes 183 are formed on the part underside by steam pins spaced as needed across the part.

The shell 190, in at least one embodiment, is comprised of two layers: an inner layer 186 and an outer layer 188. The two layers 186 and 188, are formed concurrently when a blow mold parison is formed with two layers by coextrusions or methods known in the art Inner layer 186 may have a first set of properties, such as recycled plastic composition, and outer layer 188 may have a second set of properties, such as including an ultraviolet light resistance package or a pigment. It is understood that outer layer 188 may have a different composition from inner layer 186. As a non-limiting example, outer layer 188 may include a co-polymer or 0-5 wt % of linear low density polyethylene (LLDPE) in order to increase flexibility of outer layer 188 resulting in reduced stress cracking. It is further understood that while two layers are illustrated here, a plurality of layers is contemplated. In another embodiment, the number of layers may range from one to 11. It is preferred that inner layer 186, outer layer 188, and core 184, have similar, if not identical compositions, to improve the recyclability of bumper 180.

Figure 12:
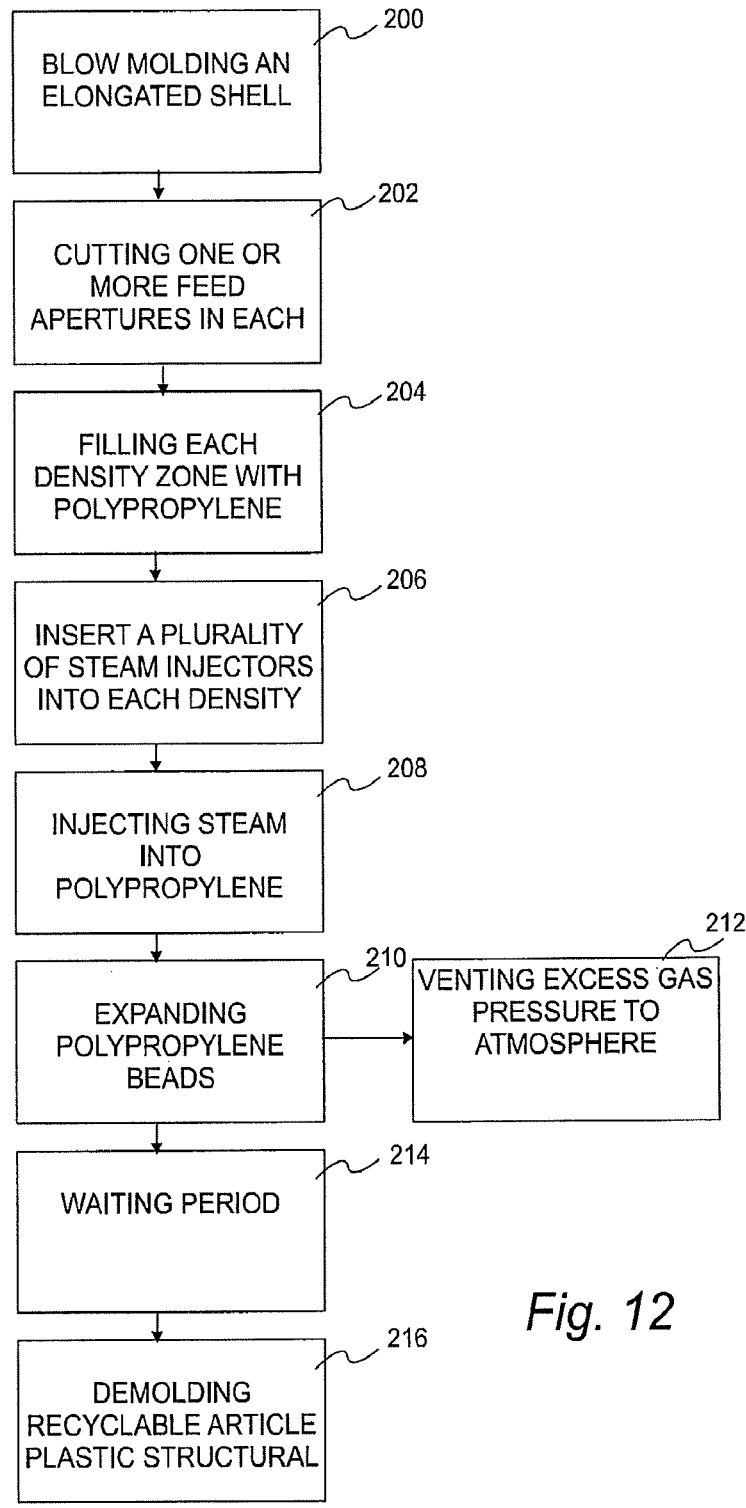
FIG. 12 illustrates a process flow diagram of a method of manufacture of a railroad tie according to at least one embodiment.

FIG. 12 diagrammatically illustrates a method for manufacturing the recyclable plastic structural article having multiple core density zones, in at least one embodiment, which includes blow-molding a hollow elongated shell in step 200. Feed apertures, such as an inlet, and heating ports are cut or pierced during step 202 into the blow-molded elongated shell of step 200. Polyolefin pellets are fed into the cavity of the elongated shell of step 200 during step 204. The density of polyolefin pellets in the lower first end of the elongated shell, are feed in first followed by the middle section, and/or the second end is controlled in step 204 during filling of the shell in one or more density zones. Steam injection needles can be inserted during step 206 into each density zone through heating ports or alternately the needles can be inserted at sit 204 before filming. In step 208 steam is injected at sufficient pressure effective to cause the polypropylene pellets to expand in step 210. Excess pressure is vented to the atmosphere in step 212. The molded railroad tie is allowed to cool in step 214. The mold is opened in step 216 to release the blow-molded recyclable plastic structural article.

Blow-molding step 200 preferably includes extruding a tubular parison. The mold is closed on the parison and about 90 to 100 lbf/in$^2$ pressure gas is applied to the parison interior cavity. The gas injected into the parison causes the plastic to conform to the shape of the walls of the mold. One or more gas injection needles are introduced to the parison prior to the cooling the plastic on the mold walls. Spacing between steam injection needles may vary with the density of unexpanded beads because the steam migration is limited. In at least one embodiment, the spacing between adjacent steam injection needles ranges from 2 inches to 6 inches.

In at least one embodiment, at approximately one half of the length of the cooling period, typically referred to as a blow cycle, feed apertures, such as fill ports, are cut. The cutting tools are withdrawn from the mold and a staged fill sequence for polyolefin pellets begins in step 204. The filling is preferably conducted from the bottom up. Upon completion of the staged fill sequence, the feed apertures are optionally closed with spin-welded plugs. The steam injection needles are injected to introduce steam for an injection time period ranging from 0.5 to 3 seconds, an injection time period sufficient to expand the bead. In at least one embodiment, steam is introduced as super heated steam. In another embodiment, steam is introduced at a pressure less than the clamp pressure on the mold sections. In yet another embodiment, steam is introduced in a range of 15 lbf/in$^2$ to 120 lbf/in$^2$. In at least one embodiment, the steam is introduced at 280° Fahrenheit and 60 lbf/in$^2$ pressure. After a cooling time period, when post-mold expansion effectively ceases, the mold is opened to release the blow-molded railroad tie. In at least one embodiment, the time to cool the railroad tie so that post mold expansion does not substantially occur ranges from about 1 minute to 8 minutes. Optionally, the mold may be vented to the atmosphere to release excess gas pressure or the mold may be burped, i.e., opened briefly and then re-closed.

Embodiments of steps 200, 202, 204, 206, and 208 are illustrated in FIGS. 13a-13d.

Figure 13:
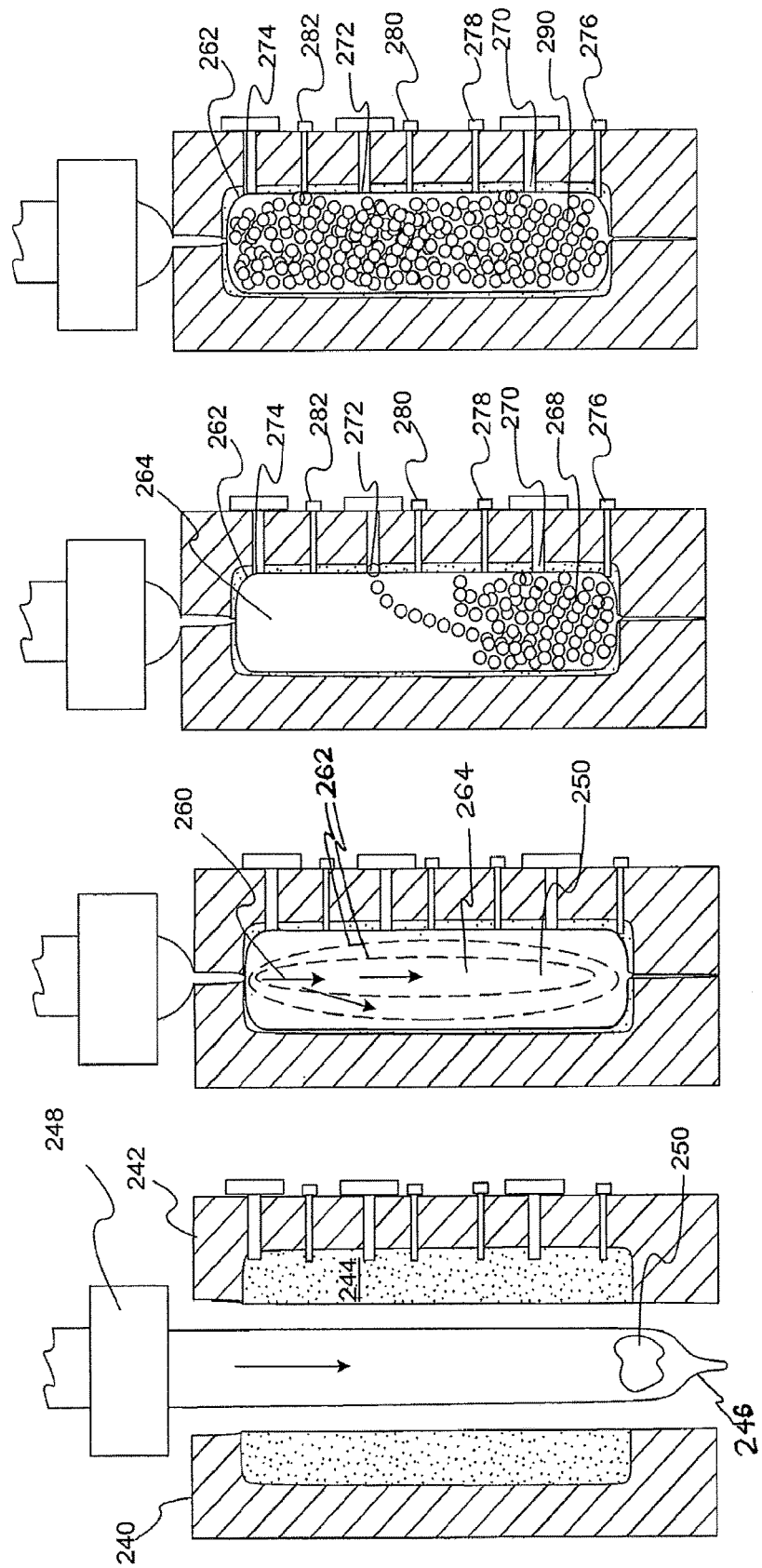
FIGS. 13a-13d schematically illustrate a process of manufacture of a railroad tie according to at least one embodiment.

In FIG. 13a, blow mold sections 240 and 242 define a blow mold cavity 244 into which a molten polyolefin parison 246 is extruded from an extruder 248. Parison 246 defines an internal parison cavity 250.

In FIG. 13b, blow mold sections 240 and 242 close upon parison 246. Gas 260 is injected into parison cavity 250 inflating the hot parison 246 while still soft and deformable to conform to the walls of the blow mold cavity 244 defining a shell 262 having a cavity 264 which may be larger than the original parison cavity 250.

In FIG. 13c, steps 202 and 204 of FIG. 10 are illustrated as feed apertures 270, 272, and 274 are cut through shell 262. Staged filling begins as unexpanded EPP beads 268 are introduced to cavity 264 through an EPP introduction device fitted to blow mold section 242. At a first stage, EPP beads 268 are introduced through feed aperture 270. When the cavity 264 is substantially filled to the height of feed aperture 270, a second stage introduces unexpanded EPP beads 268 through aperture 272 until that portion of cavity 264 is substantially filled. A third stage introduces unexpanded EPP beads 268 through aperture 274 until the cavity 264 is filled.

EPP introduction device (not shown) is withdrawn from apertures 270, 272, and 274. The apertures 270, 272, and 274 are plugged. Steam injection needles 276, 278, 280, 282 are inserted through blow mold section 242 and shell 262 into the filled cavity 264.

In FIG. 13d, steam is injected through steam injection needles 276, 278, 280, 282 into unexpanded beads 268 causing the beads to expand forming a core 290 in the area that was previously cavity 264, and bonded to the shell 262.

Figure 14:
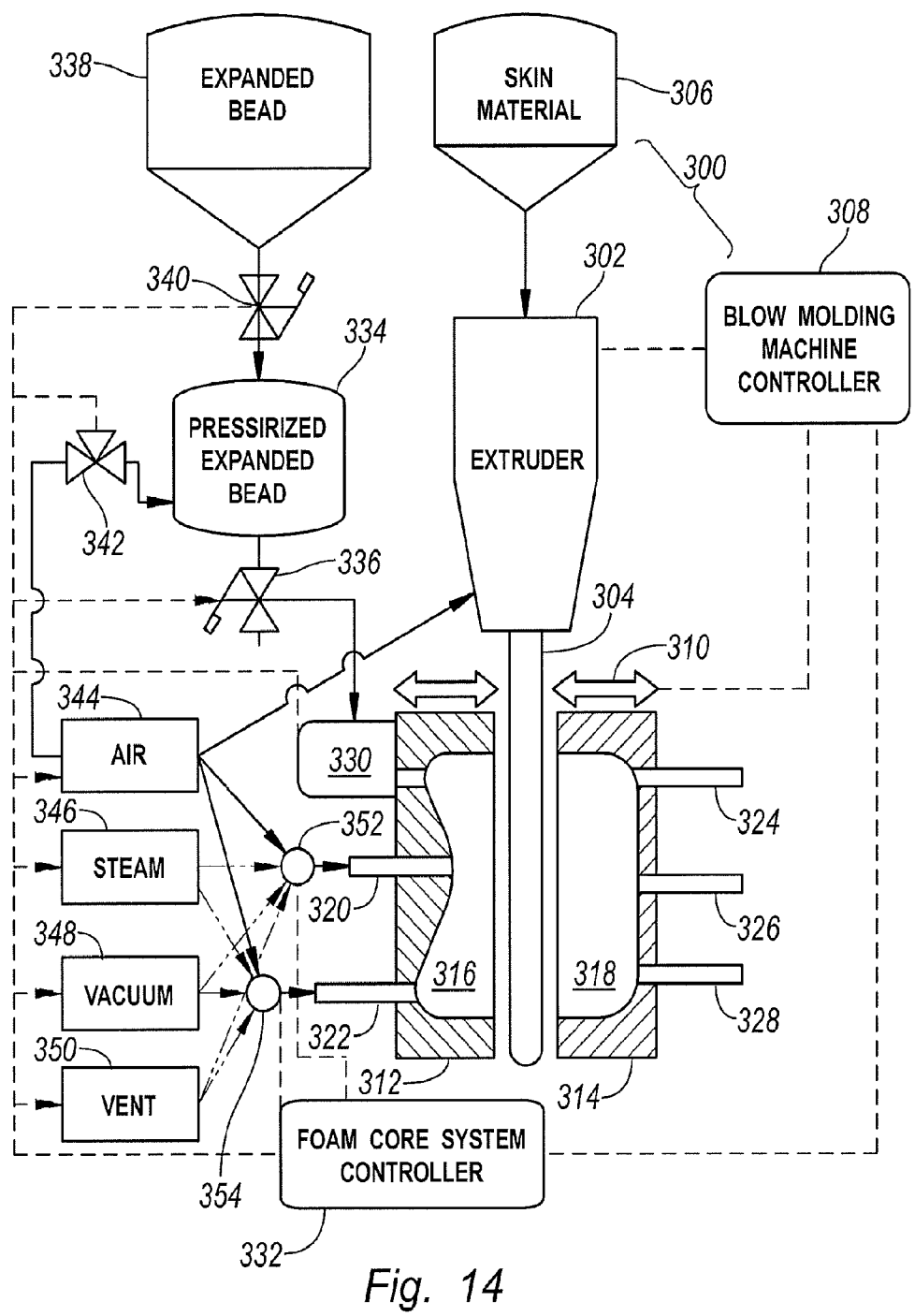
FIG. 14 is schematic illustration of an extrusion blow molding machine equipped with a foam core system.

FIG. 14 illustrates an extrusion blow molding machine 300 having a vertical extruder 302 for forming an elongate hollow plastic parison 304 out of plastic skin material supplied by hopper 306. A bold molding machine controller 308 controls the operation of extruder 302 and a mold actuator 310 capable of moving two mold halves 312 and 314 positioned on opposing lateral sides of the extruded parison 304 and between an open position illustrated and a closed position to entrap the parison within an internal cavity formed by internal mold cavity halves 316 and 318. Mold halves 312 and 314 are specifically adapted for forming a foam core article using the described methods. The mold halves are provided with a series of steam injector pins 320-328. Although only five steam pins are illustrated for simplicity purposes, the steam pins will be provided in an array having a sufficient number to thoroughly steam the product to be formed.

At least one of the mold halves will be provided with a bead fill gun 330 having a bead fill port which communicates with mold interior cavity portion 316. For simplicity purposes a single fill gun is illustrated, however, multiple filled guns at various locations can be provided as illustrated previously with respect to FIGS. 13a-13d. Preferably, at least one fill gun is located generally proximate the upper region of the mold cavity as illustrated in FIG. 14. Fill gun operation is controlled by a foam core system controller 332. Preferably, foam core system controller 332 is a separate controller which communicates with the blow molding machine controller 308. In that way, the foam core system can be added to existing blow molding extruding systems. Alternatively, the foam core system controller can be incorporated into the blow molding machine controller for new machines or in reconstructed blow molding extrusion machines.

The bead fill gun 330 is supplied with expanded bead under pressure from tank 334 which is coupled to the fill gun 330 by an interconnecting supply line containing and valve 336 controlled by foam core controller 332. The expanded bead is supplied to pressurized tank 334 from an expanded bead hopper 338 by a supply line containing a valve 340, again regulated by the foam core system controller 332. The pressure of the expanded bead in tank 334 is maintained by a three-way pressure regulator valve 342 coupling the pressurized tank 334 to a source of pressurized air 344. The operation of the three way pressure regulator valve 342 is controlled by the foam core controller enabling the controller to pressurize the tank to the desired pressure, preferably, 80 to 120 pounds per square inch gauge pressure (PSIG) and to alternatively vent the tank 334 to atmosphere to facilitate the introduction of more bead into the tank.

The steam pins 320-328 can be alternatively connected to pressurized air source 344, steam source 346, a vacuum source 348 and a vent 350. To facilitate these alternative connections and to enable a number of steam pins to be associated together in zones, a steam pin manifolds 352 and 354 are provided. In the illustrate schematic, only two manifolds are shown for simplicity, however, preferably, up to ten and more preferably about 6 manifolds can be operated by the foam core system controller. Each of the manifolds are connected to a series of steam pins and each manifold has an input/output connection to each of the air source, steam source, vacuum and vent 344, 346 and 348 and 350. Each of the input/output connections is controlled by a flow valve operated by the foam core system controller.

Figure 15C:
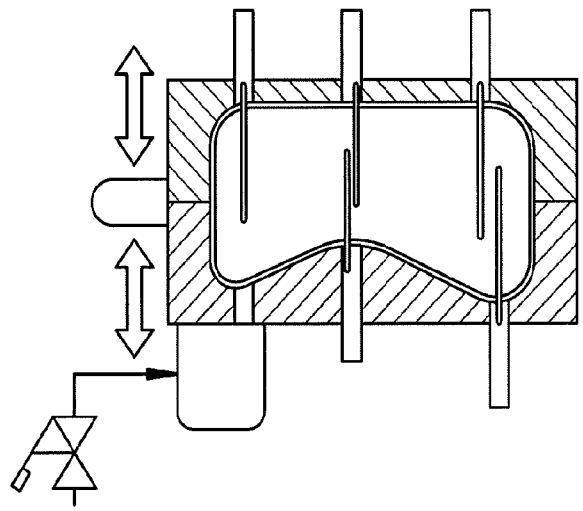
Figure 15B:
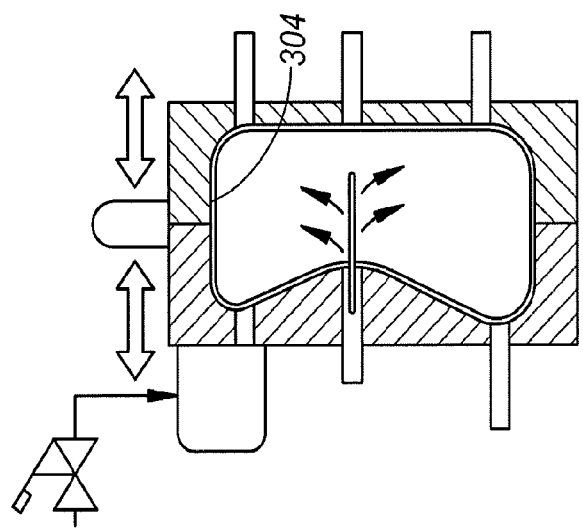
Figure 15A:
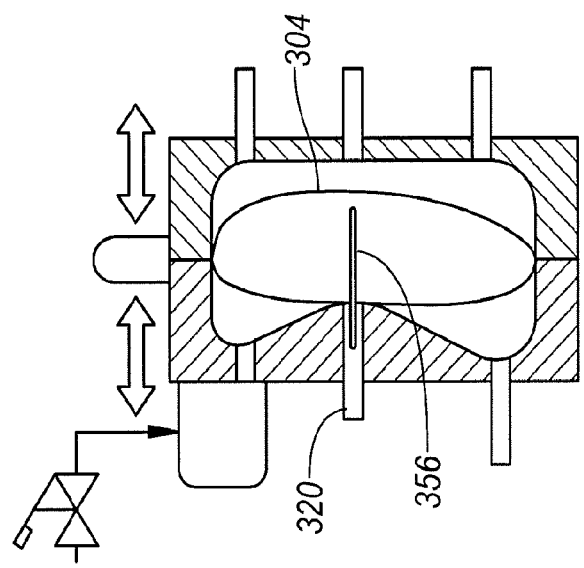
Figure 15F:
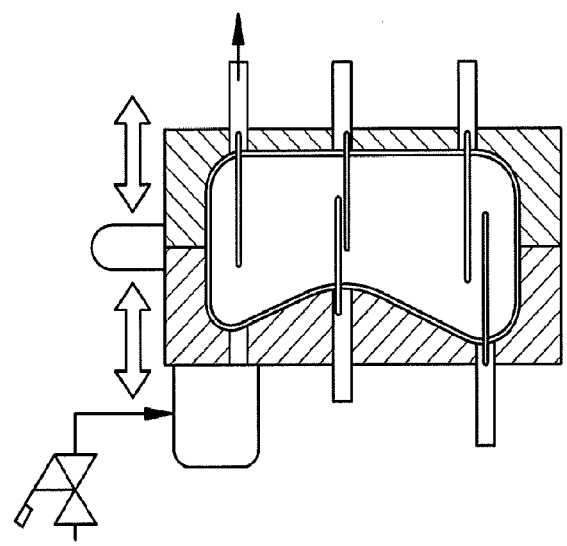

In operation, with the mold shown in the open position, as illustrated in FIG. 14, the extruder forms a tubular hollow plastic parison 304 of the thermoplastic skin material. Once the parison has reached the desired length relative to the cavity, the blow molding machine controller issues a closed mold signal causing the mold drive 310 to close the mold halves together. Upon issuance of the closed mold signal, the foam core system controller begins operation and temporarily takes over control of the blow molding machine. Immediately prior to or contemporaneously with the closing of the mold, the extruder will provide pressurized air into the internal cavity defined by the parison in what is known as a puffing operation so that when the mold is closed as illustrated in FIG. 15a, a portion of the partially inflated parison wall will contact a region of the mold cavity as illustrated. One or more steam pins in this first contacted region of the mold will be actuated driving a steam pin needle 356 into the hollow interior cavity of the blow molded parison 304. Once the first actuated needle or needles 356 extend into the parison, the foam core controller, opens the air valve supplying air to manifold 354 which in turn supplies air to needle 356 to blow the plastic parison 304 into a shell fully conforming it to the interior surfaces of the cavity halves 316 and 318 of mold halves 312 and 314. Once fully inflated, as shown in FIG. 15b, the controller will open air valves to the other manifolds 354 so that all the needles from all of the steam pins projecting provide pressurized gas such as air into the interior cavity of the parison 304 to fully conform to the interior shape of the mold cavity. As will be described further in detail, subsequently, foam core system controller will cause all of the steam pins to be vented initially allowing the internal pressure within the shell to drop from the blow molding pressure of 80 to 120 PSIG, preferably 90 PSIG. Once the pressure drops down to about 40 PSIG the fill gun cutter punches or cuts a hole into the hollow shell. The cutter then retracts as illustrated in FIG. 15D, and the filling process begins. When the pressure nears the tank pressure, all of the steam pins will be closed accept the most remote steam pins from the fill gun which were main vented whereupon the control valve 336 will open and the fill gun mandrel will open along via flow from the pressurized tank 334 into the shell cavity in a controlled manner. The venting of the manifold associated with the remote steam pins will be controlled to maintain a desired part cavity pressure. When the pressure drops below that of the pressurized bead tanks 334, which is about 30 PSIG + or −2 PSIG bead flows into the shell cavity. The pressure of the vented manifold is maintained approximately 5 PSIG below the fill tank pressure providing adequate pressure differential for the quick and orderly filling of the cavity with bead without forming voids.

Figure 15E:
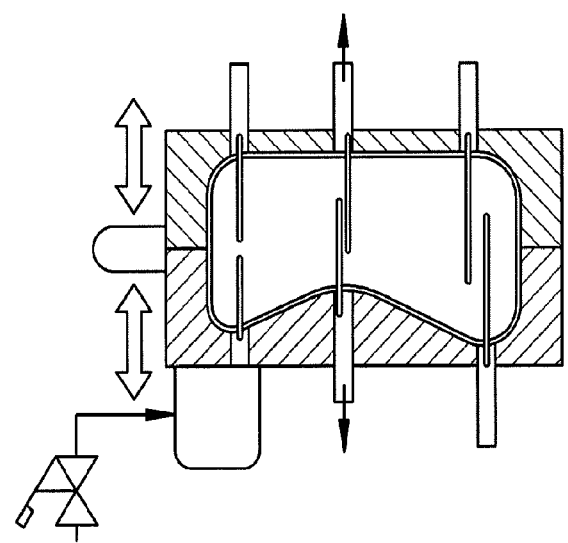
Figure 15D:
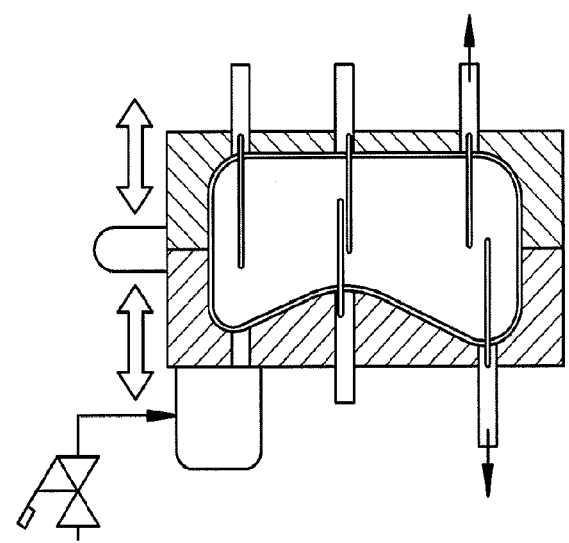

Once the distal region of the cavity is initially filled with beads, then the next set of steam pins is vented as is illustrated in FIG. 15e and the filling operation continues zone by zone until the final collection of steam pins proximate the fill gun is vented. Upon the achieving a substantially completely filled with beads, the fill gun closes as will be described in more detail. Subsequently, once closed, all of the steam vents are vented to atmosphere. Once vented to atmosphere, the beads further expand in size from their fill state and grow approximately 3% in volume as the pressure within the cavity cell drops from 25 PSIG to atmospheric pressure. This causes the beads to completely fill the cavity and to be slightly deformed as they contact one another.

Once the cavity is vented, the bead steaming process will begin one-half of the steam pins will be connected to a steam source while the other half of the steam pins will be connected to the vacuum source or alternatively, connected to atmosphere and the system operated without a vacuum source. After a relatively short time period, the initial steam pins provided with steam will be connected to the vacuum source and the remaining pins will be connected to the steam vent and the steam process will continue until the expanded beads are heated sufficiently to expand and melt together and to bond to the wall of the skin. Following the steam process as illustrated in FIG. 15g, the condensate, removal and cooling step begins. One half of the steam pins will be connected to a source of pressurized air while the other half of the steam pins will be vented to atmosphere. Then, the pins originally connected to pressurized air will be vented to atmosphere and the vented pins will be connected to a source of pressurized air. This step removes condensate from the bead steaming from the expanded bead and causes the bead to be cooled. This process continues until the bead has reached the desired temperature, whereupon the steam pin needles are refracted and the mold halves opened so the part can be de-molded as shown in 15i. At this point, the foam core controller passes control of the operation back to the blow molding machine controller so that the next part can be formed.

Figure 16A:
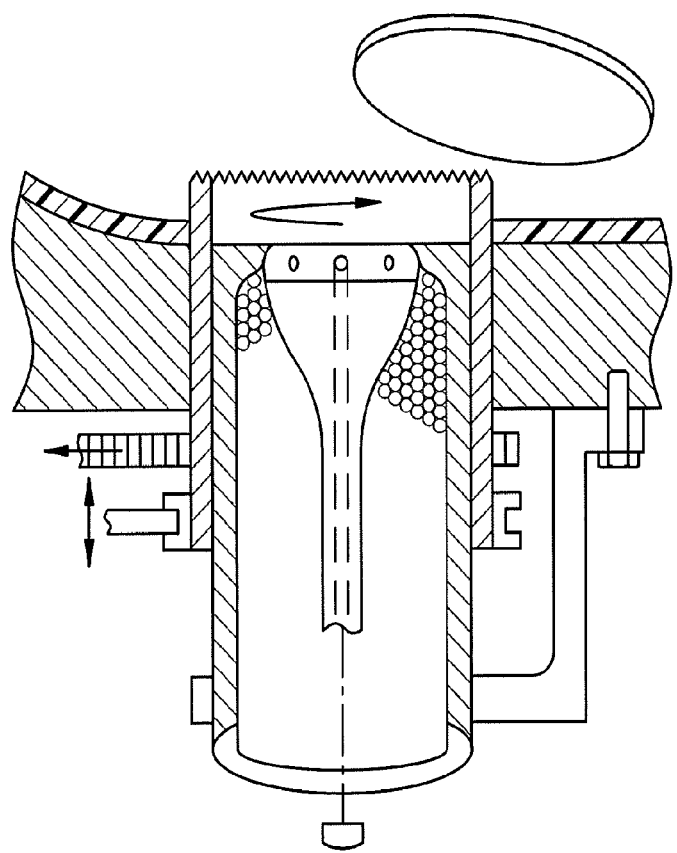
FIGS. 16a-16d illustrate a bead filled gun in various states of operation.
Figure 16B:
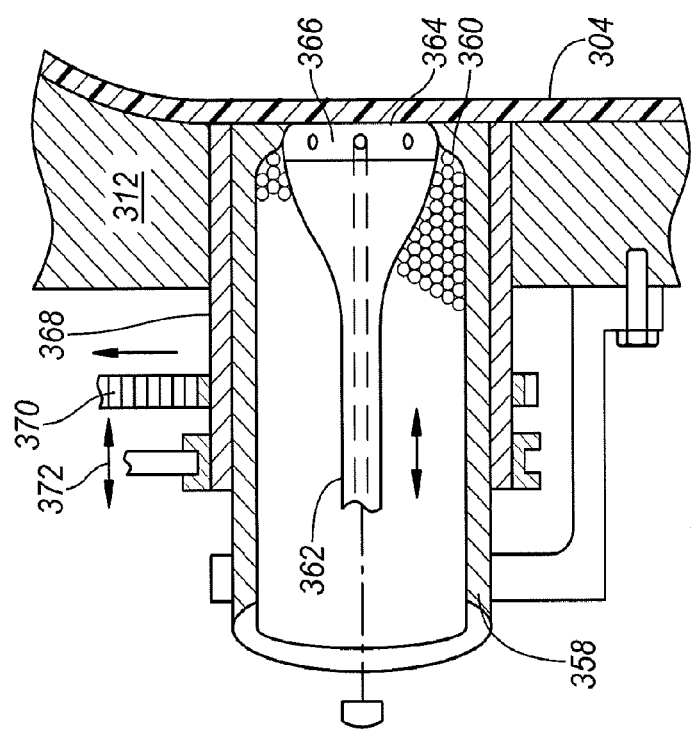
Figure 16D:
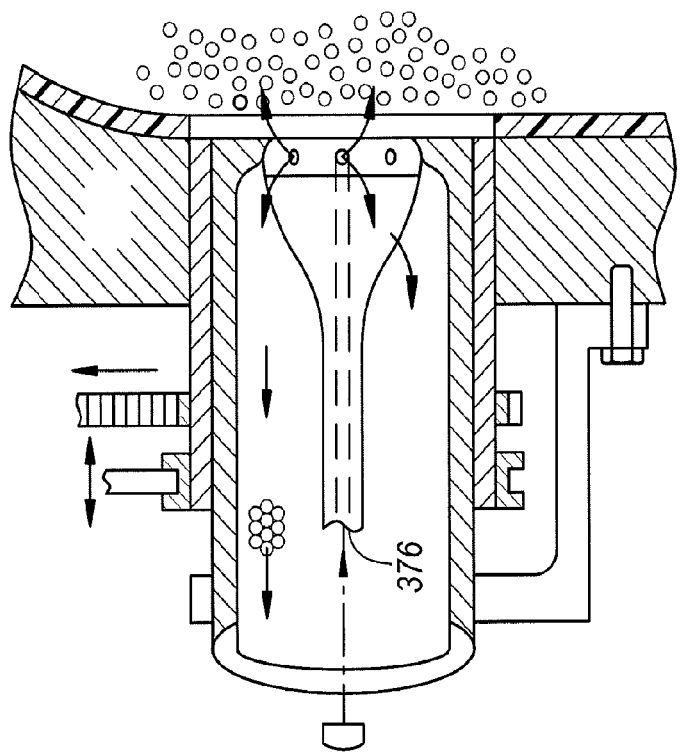

An enlarged schematic illustration of blow gun 330 is shown in FIGS. 16a-16d, illustrating various states of operation. In FIG. 16a, the fill gun is shown in the closed orientation. Blow gun 330 is installed in mold cavity half 312. The fill gun has three main components; a fill tube 358 having a distal end flush with the mold cavity interior wall forming a fill aperture surrounded by frusto conical valve seat 360. An elongate mandrel 362 has a distal end forming a face 364 conforming to the cavity wall when the mold halves are in the closed position and a frusto conical surface 366 which cooperates with frusto conical seat 360 of the fill tube 358 to form a tight seal when the mandrel is moved to the closed position as shown in FIG. 16a. When closed, mandrel 362 prevents beads from entering the cavity and the base of the mandrel 364 and the associated face of the distal end of the fill tube 358 conformed to the interior cavity wall of mold half 312 as the plastic parison 304 is blown into a shell conforming to the cavity interior as illustrated in FIG. 16a. Preferably, after the plastic shell wall is cooled sufficiently and is maintained in conformity to the mold cavity by the interior gas pressure, a tubular hole saw 368 is operated. The tubular hole saw 368 surrounds fill tube 358 and rotatably fits within a correspondingly sized cylindrical cavity in mold half 312. Tubular hole saw 368 is provided with an external drive gear or sprocket operatively driven by a belt chain or mechanical gear to rotate the saw relative to the mold. A conventional drive 370 can be utilized provided as relatively compact and meets the minimal speed and load requirements of a hole saw. The hole saw is also provided with an actuator mechanism such as a fork operated by a hydraulic or pneumatic cylinder to advance the linear rotating hole saw into the cavity interior as shown in FIG. 16D, cutting a round plug out of the shell wall whereupon the actuator 372 will retract the hole saw and the operation of the drive mechanism can be terminated.

Figure 16C:
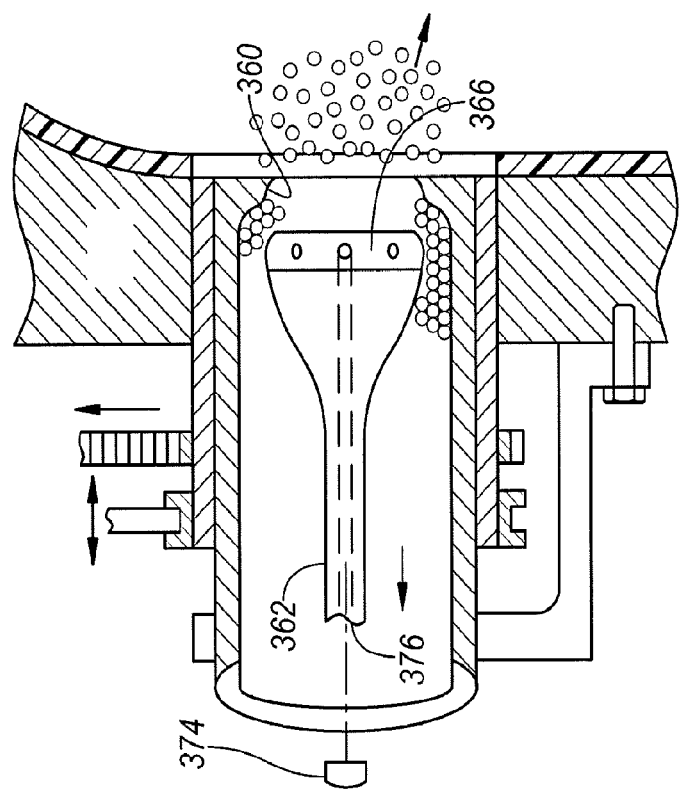

With the hole in the shell formed, the fill process can begin. As shown in FIG. 16c, the mandrel 362 is retracted by a linear actuator 374 such as pneumatic or hydraulic cylinder or an electric linear actuator such as ball screw to cause the frusto conical face 366 to lift off of conical seat 360 allowing bead to flow into the interior of the plastic shell. The fill process continues until the plastic shell is completely filled as previously described.

In order to close the fill gun, it is necessary to remove the bead from the region of the conical seat 360 and the corresponding frusto conical face 366. To do so, a tubular passage 376 allows air to be provided to a series of outlet ports in frusto conical face 366, the high pressure blast of air exiting these outlet ports, clears the bead allowing the mandrel to be closed. In order to enable the bead to be blow back out of the fill tube, optionally, the fill valve 336 can be maintained in the open position and the pressure in the tank 334 can be reduced enabling the bead to be pushed back through the fill gun and fill line into the pressure tank 334.

In the embodiment illustrated in FIG. 14, a single pressure tank is provided coupled to a source of bead. If multiple density bead is to be used, it is possible to have multiple pressure tanks, each with its own supply of different density bead coupled to a single fill gun. After a desired amount of the first bead is introduced, the pressure tank can be vented and pressurized air supplied to the mandrel to blow the bead in the fill tube back into the pressure tank, whereupon the pressure tank valve can be closed and the pressure tank valve for a second source of bead of a different density can be connected to the fill gun to continue the filling process. Accordingly, it is possible to build a railroad tie as described previously, having high density beads in the railroad tie ends and a low density bead in the center utilizing a single fill gun and the upper end of the railroad tie as molded, the fill gun alternatively being connected to the two different pressure tanks containing different density bead.

Figure 17:
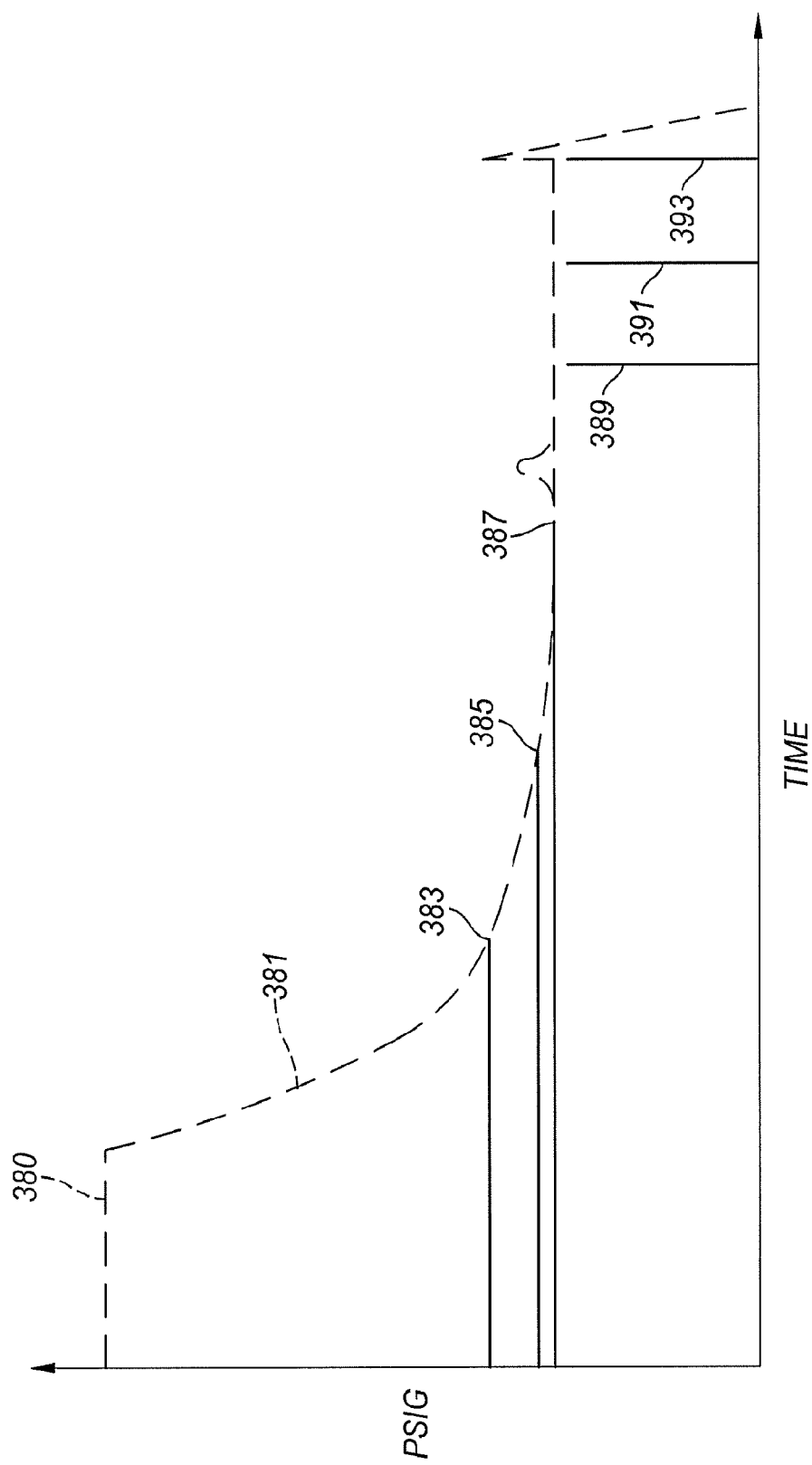
FIG. 17 is a diagram of mold pressure versus time prior to and during the bead fill process.

FIG. 17 is a pressure diagram illustrating the pressure in the mold cavity interior as the part is initially blown, vented and filled with bead. The pressure represented by the dotted line is proportional to the pressure within the mold and pressure will be measured at the steam pin manifold or closer to the mold at the steam pin. During the blowing process, the cavity pressure is at a blow pressure 380 which is about 80-120 PSIG, preferably about 90 PSIG. When the blow cycle is complete, the steam pin vents open causing a rapid pressure drop as illustrated in region 381 of pressure curve. At a selected pressure, in this instance approximately 40 PSIG illustrated at point 383, all the steam pins are closed except for the most distal steam pins allowing the pressure to continue to drop at a reduced rate. At the next selected pressure point 385, which is approximately 30 PSIG, the hole saw cuts the fill hole and retracts. When the pressure drops further and reaches a fill pressure, which in this embodiment, illustrated at approximately 25 PSIG. at point 388 in FIG. 17, the fill gun mandrel opens allowing the bead to introduced into the shell cavity, causing a momentary spike in pressure. After the first most distal zone is filled, the second set of vents open, at point in time 389, allowing filling to continue. The third set of vents at point in time 391. When the cavity is full of bead, the fill gun goes through a clear and close step causing a momentary spike in pressure as illustrated at time 393. During the filling process, the pressure is maintained at the desired fill pressure by regulating the outlet of the manifold using a vent valve controlled by the system controller 332. Once the fill gun is closed, the manifold is fully vented allowing all of the pins to vent.

Figure 18:
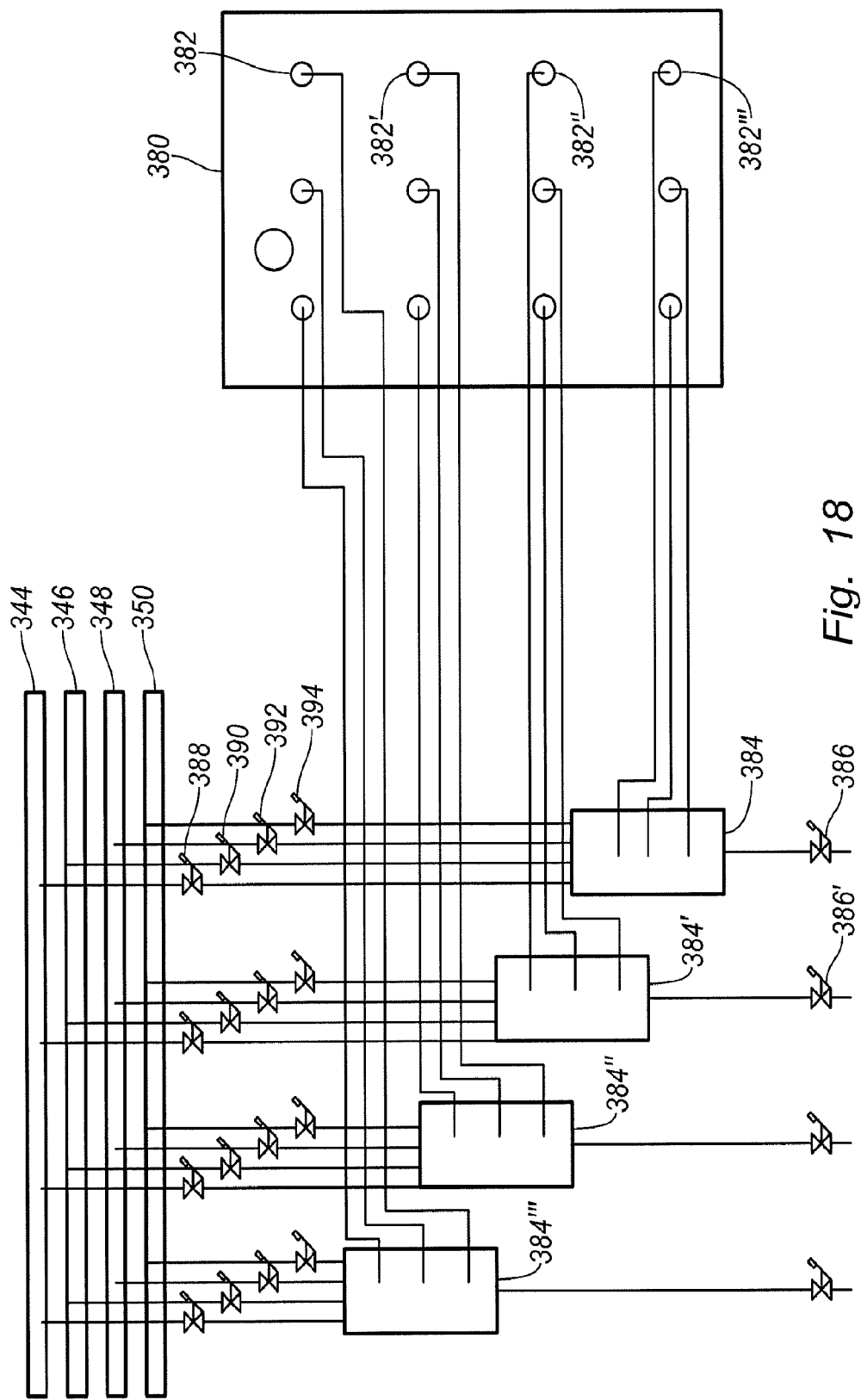
FIG. 18 is a more detailed schematic illustration of the array of steam pins in the mold and the associated manifolds and alternative connections to the air steam vacuum in vent lines.

For the purpose of illustration, FIG. 14 only illustrated two manifolds and a limited number of steam pins. A typical part will require more than two manifolds with a series of steam pins associated with each manifold. Each of these manifold are independently connectable to air, steam, vacuum and vent. FIG. 18 illustrates a mold for an elongate part having a substantial width such as a structural panel. The mold 380 is provided with 12 steam pins 382 oriented in four rows of three with each row representing a zone connected to one of four manifolds 384, 384', 384" and 384'". Each of the manifolds has an outlet which is preferably located at its lower most point connected to a controllable valve 336 which is regulated by the foam core system controller 332. Each manifold has four inlets in the embodiment illustrated, connected to air source 334, steam source 346, vacuum source 348 and vent 350. As previously noted, it is possible to operate this system without a vacuum source utilizing the vent during the condensate removal process. The inlets in the manifolds are controlled independently by air valve 388, steam valve 390, vacuum valve 392 and vent 394, each operated by the foam core system controller. The corresponding valves for each of the manifolds are also independently controlled by the system controller in the preferred embodiment. Accordingly, a great deal of flexibility in the control of the foam core process is achievable.

One example of the process flexibility obtainable by the previously described structure is illustrated by the preferred steaming process. In order to minimize the amount of condensate introduced into the bead, prior to opening steam valve 346 to introduce steam into the manifold, the outlet valve 386 is opened allowing all of the condensate to drain from the manifold. When steam valve 390 is open, due to the relatively large size of the outlet opening in valve 386, steam will flow rapidly through the manifold and exit, removing any wet steam from the manifold and heating the manifold. Once hot outlet valve 386 is rapidly closed causing steam to be injected into the bead through the associated steam pin needles. Each manifold is purged and preheated prior to each steaming operation, thereby maximizing the temperature and dryness of the steam introduced in order to heat the bead with the minimum amount of water, which in turn minimizes the amount of drying time necessary to remove the condensate.

Figure 19:
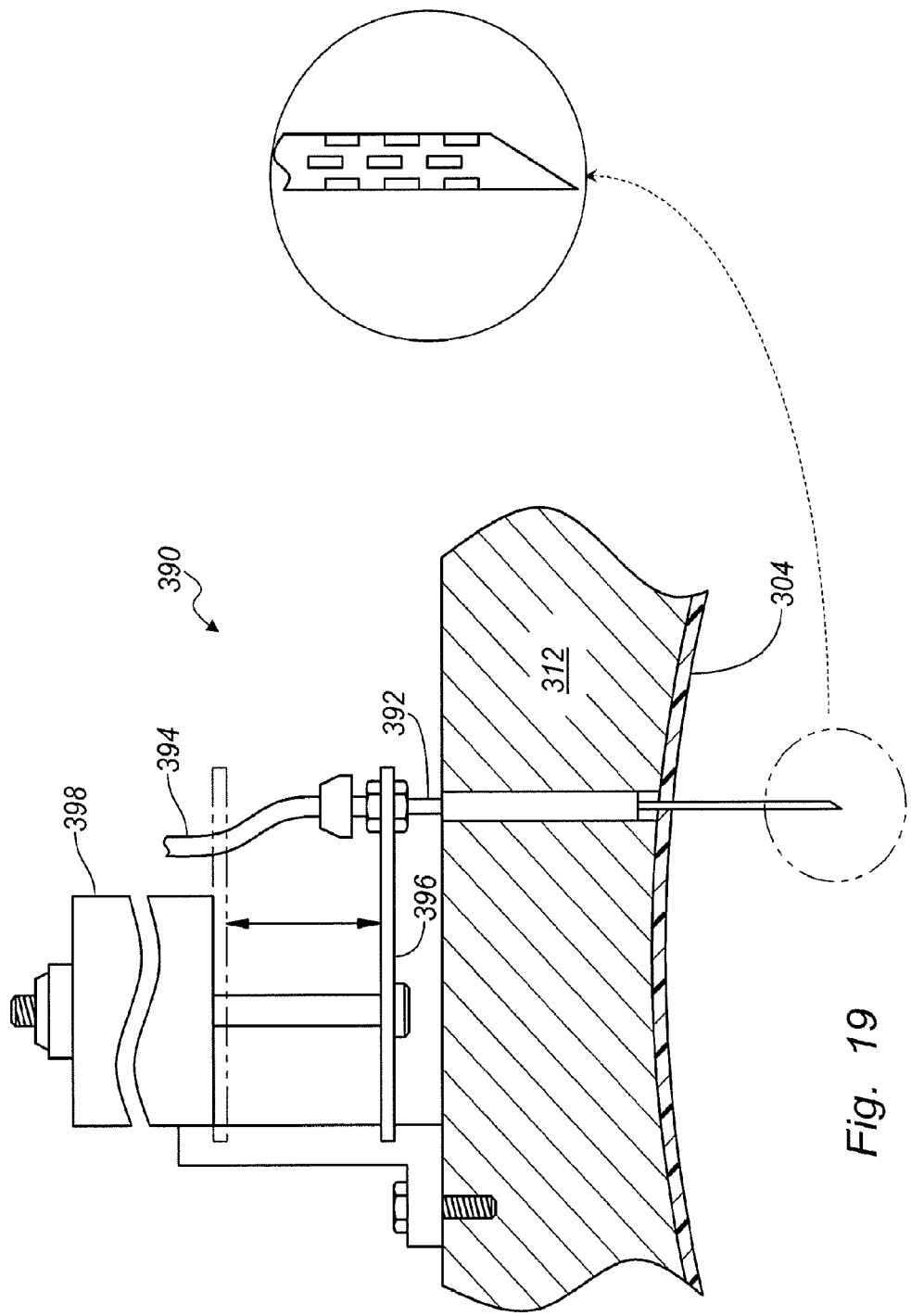
FIG. 19 is a cross-sectional view illustrating a steam pin actuator and an enlarged steam pin tip region.

Preferably, each of the steam pins is provided with a linear actuator to drive the steam pins in and out of the mold cavity. A representative steam pin actuator is illustrated in FIG. 19. Steam pin assembly 390 includes a needle 392 having a distal end which projects into the mold when extended and a proximate end connected to a steam line 394 which is coupled to the manifold. The steam needle 392 is affixed to a support plate 396 which can be shifted between a needle extended position as shown and a needle retracted position illustrated in dotted outline. The support plate 396 is linearly moved by a pneumatic double ended cylinder 398 between two adjustable stop positions. Cylinder 398 is mounted to the mold half 312 by support bracket as illustrated. The tip of the needle as illustrated in the exploded view, has a sharp point and a series of steam ports extending over the portion of the needle that extends through the wall of the plastic shell wall 304, preferably the steam ports in the needle wall end short of the shell 304 wall. Preferably, the steam needle 392 is made of relatively thin wall stainless steel in order to have good corrosion resistance and low thermal mass.

Figure 20:
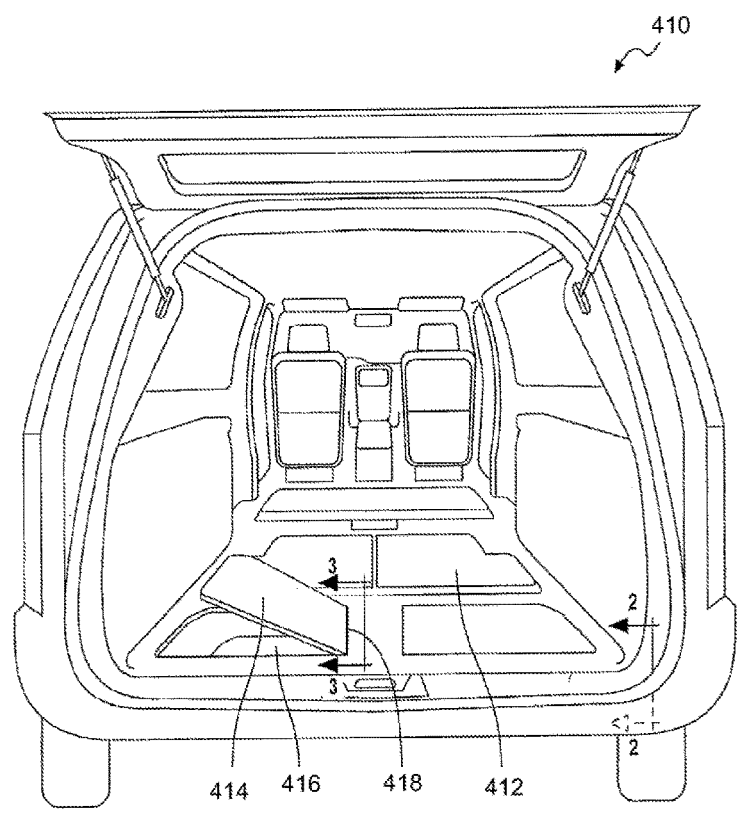
FIG. 20 schematically illustrates a vehicle having a load floor system according to at least one embodiment.

FIG. 20 schematically illustrates a vehicle 410 having a load floor system according to at least one embodiment. Vehicle 410 has a load floor 412 including a load floor door 414 covering a compartment 416 situated beneath load floor 412. Load floor door 414 is hingedly attached to load floor 412 with a living hinge 418.

Figure 21:
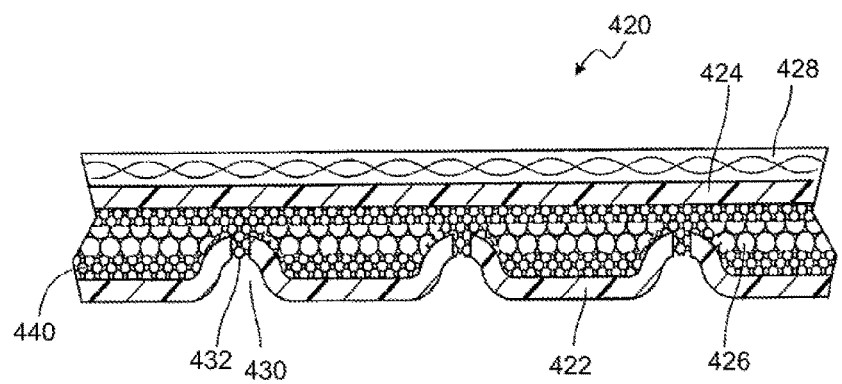
FIG. 21 schematically illustrates a fragmentary cross-sectional view of a load floor system component along axis 2-2 of FIG. 1 according to at least one embodiment.

FIG. 21 schematically illustrates a fragmentary cross-sectional view of a load floor system component along axis 2-2 of FIG. 20 according to at least one embodiment. The cross-sectional view is of panel 420 of load floor 412. Panel 420 includes a first layer 422, a second layer 424 opposed to and spaced apart from first layer 422, and an in-situ foam core 426 disposed therebetween and thermally bonded to a first surface of both the first and second layers 422 and 424, respectively. An aesthetic layer 428, such as a carpet or a backed carpet, is connected to second layer 424 on a second surface opposite from in-situ foam core 426.

First layer 422 and includes a plurality of optional embossments 430. In at least one embodiment, a portion of embossments 430 closest to second layer 424 is separated from second layer 424 by a distance ranging from 0.5 inches to 4 inches. In at least one embodiment, a portion of embossments 430 closest to second layer 424 is separated from second layer 424 by a distance ranging from 1 inch to 4 inch. Such distances permit the free flow of pre-expanded beads into the narrowest gaps between first layer 422 second layer 424 in order to uniformly fill core 426 when the pre-expanded beads are expanded to fully-expanded beads 440 in an expansion step. In at least one embodiment, embossments 430 includes an injection port 432 into which a rotary cutter, a bead dispensing device, and a steam pin can be sequentially inserted when creating in-situ foam core 426.

The steps of expanding the pre-expanded beads 420 are illustrated by U.S. patent application Ser. Nos. 13/358,181, 13/005,190, and 12/913,132 all of which are incorporated herein by reference.

In at least one embodiment, first and/or second layer 422 and 424, respectively, thickness may range from 0.02 inches to 0.5 inches. In another embodiment, the thickness of first and/or second layer 422 and 424, respectively, may range from 0.125 inches to 0.25 inches.

In at least one embodiment, in-situ foam core 426 thickness may range from 0.15 inches to 6 inches. In another embodiment, in-situ foam core 426 thickness may range from 0.2 inches to 4 inches. In another embodiment, in-situ foam core 26 thickness may range from 0.5 inches to 1 inch.

First and/or second layer 422 and 424, respectively, in at least one embodiment, are formed of a composition of any moldable composition. Non-limiting examples of the composition include, but is not limited to, a liquid silicone rubber, a synthetic rubber, a natural rubber, a liquid crystal polymer, a synthetic polymer resin, and a natural polymer resin. In another embodiment, first and/or second layer 422 and 424, respectively, are formed of a composition of a thermoplastic polymer, a thermoset polymer, or blends thereof having a viscosity ranging from 0.1 grams/10 min to 40 grams/10 min. The viscosity is measured according to ASTM D-1238 at 190° C. with a 2.16 kg weight. In yet another embodiment, first and/or second layer 422 and 424, respectively, are formed of a composition of a polyolefin including polypropylene and polyethylene having a viscosity ranging from 1 grams/10 min to 30 grams/10 min.

In-situ foam core 426, in at least one embodiment, is formed of a composition of any fluid-expandable material. Examples of fluid-expandable material include, but are not limited to, a polyolefin polymer composition, a biopolymer expandable bead, an alkenyl aromatic polymer or copolymer, a vinyl aromatic polymer resin composition, and a polystyrene polymer composition. In at least one embodiment, the polyolefin polymer composition includes polyolefin homopolymers, such as low-density, medium-density, and high-density polyethylenes, isotactic polypropylene, and polybutylene-1, and copolymers of ethylene or polypropylene with other: polymerized bull monomers such as ethylene-propylene copolymer, and ethylene-vinyl acetate copolymer, and ethylene-acrylic acid copolymer, and ethylene-ethyl acrylate copolymer, and ethylene-vinyl chloride copolymer. These polyolefin resins may be used alone or in combination. Preferably, expanded polyethylene (EPE) particles, cross-linked expanded polyethylene (xEPE) particles, polyphenyloxide (PPO) particles, biomaterial particles, such as polylactic acid (PLA), and polystyrene particles are used. In at least one embodiment, the polyolefin polymer is a homopolymer providing increased strength relative to a copolymer. It is also understood that some of the particles may be unexpanded, also known as pre-puff, partially and/or wholly pre-expanded without exceeding the scope or spirit of the contemplated embodiments.

Pre-expanded beads, in at least one embodiment, are the resultant bead after raw bead has undergone a first expansion step of a two-step expansion process for beads. During the first expansion step, raw bead is expanded to 3% to 95% of the fully expanded bead size. The fully expanded bead is the bead that forms in-situ foam core 426. In another embodiment, pre-expanded bead is result of the first expansion step where raw bead is expanded from 25% to 19% of the fully-expanded bead 40 size.

A fluid for the second expansion step of the two-step expansion process for beads causes the pre-expanded beads to expand completely to form the fully expanded beads. Examples of the fluid include, but is not limited to, steam and superheated steam.

Polyolefin beads and methods of manufacture of pre-expanded polyolefin beads suitable for making the illustrated embodiments are described in Japanese patents JP60090744, JP59210954, JP59155443, JP58213028, and U.S. Pat. No. 4,840,973 all of which are incorporated herein by reference. Non-limiting examples of expanded polyolefins are ARPLANK® and ARPRO® available from JSP, Inc. (Madison Heights, Mich.). The expanded polypropylene, such as the JSP ARPRO™ EPP, has no external wall such as first and/or second layers 422 and 424, respectively.

Figure 22:
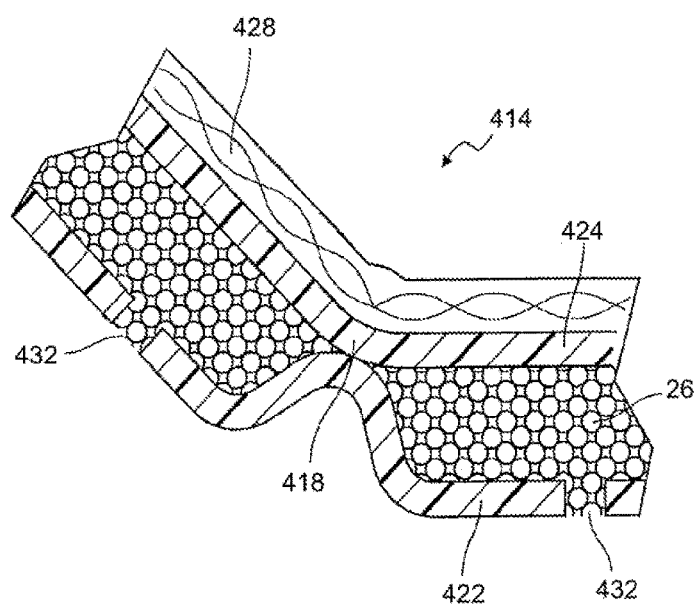
FIG. 22 schematically illustrates a fragmentary cross-sectional view of a load floor system component including a living hinge along axis 3-3 of FIG. 1 according to at least one embodiment.
Figure 23A:
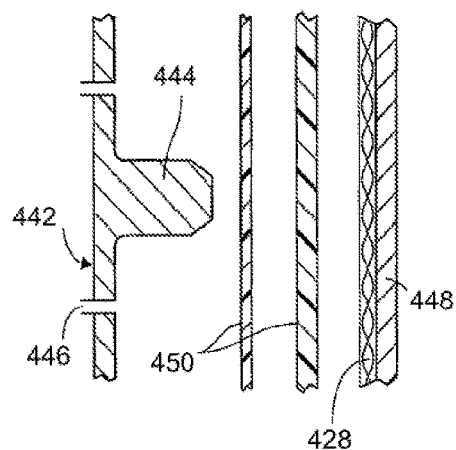
FIGS. 23A-D schematically illustrate fragmentary cross-sectional views of a method of manufacture of a load floor system component including a living hinge according to at least one embodiment.
Figure 23B:
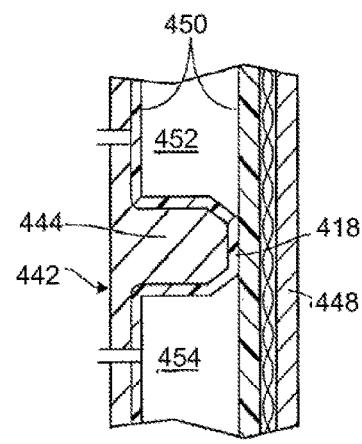
Figure 23C:
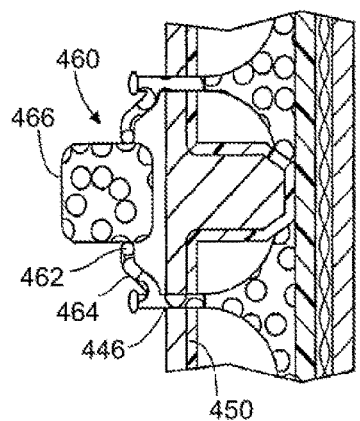
Figure 23D:
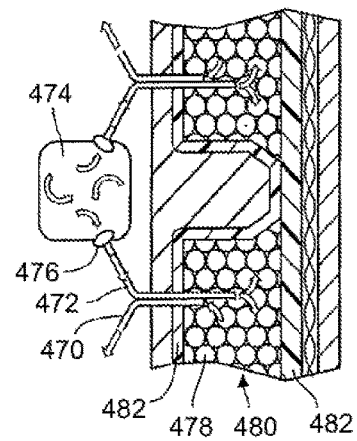

In at least one embodiment, in-situ foam core 426 density, after expansion by steam such a such as in FIG. 22, ranges from 1 lb/ft$^3$ to 25 lbs/ft$^3$. In at least one embodiment, in-situ foam core 426 density, after expansion by steam such as in FIG. 20, ranges from 1.5 lbs/ft$^3$ to 15 lbs/ft$^3$. In at least one embodiment, in-situ foam core 426 density, after expansion by steam such as in FIG. 22, ranges from 2 lbs/ft$^3$ to 9 lbs/ft$^3$. In at least one embodiment, in-situ foam core 426 density, after expansion by steam such as in FIG. 20, ranges from 3 lbs/ft$^3$ to 6 lbs/ft$^3$.

Preferably, in at least one embodiment, steam-injected expanded polypropylene (EPP) has a density ranging from 1 lb/ft$^3$ to 20 lbs/ft$^3$. In yet another embodiment, steam-injected EPP may have a density ranging from 1.5 lbs/ft$^3$ to 10 lbs/ft$^3$. In yet another embodiment, steam-injected EPP may have a density ranging from 2 lbs/ft$^3$ to 6 lbs/ft$^3$. In yet another embodiment, steam-injected EPP may have a density ranging from 3 lbs/ft$^3$ to 5 lbs/ft$^3$.

In at least one embodiment, first and/or second layer 422 and 424, respectively, with a range of 0.025 inch thickness to 0.1 inch thickness is comprised of a metallocene polypropylene. Such a combination is found to improve adhesion between first and/or second layer 422 and 424, respectively, and in-situ foam core 426 formed of EPP.

In at least one embodiment, aesthetic layer 428 includes a textile layer such as a carpet layer. In another embodiment, aesthetic layer 428 includes a laminate layer. Non-limiting examples of the laminate layer include a hard wood floor layer, a composite laminate over a core, a resin layer, and a polyurethane coating, such as a truck bed liner.

FIG. 22 schematically illustrates a fragmentary cross-sectional view of a load floor system component, load floor door 414 including living hinge 418 along axis 3-3 of FIG. 20 according to at least one embodiment. First layer 422 connects with second layer 424 to form living hinge 418. Second layer 424 does not need to be a load-bearing component that is structurally rigid. It is preferable that the second layer 424 is flexible, and even more preferably stretchable along two axes, that is, biaxially oriented, such that the second layer 424 is durable for at least 1000 cycles of 180° bending. It is more preferable, the in at least one embodiment, second layer 424 is sufficiently flexible that second layer 424 is durable for at least 5000-10,000 cycles of 180° bending. Surprisingly, is preferable to use the same metallocene polypropylene which gives very good adhesion to in-situ foam core 426 formed of EPP also provides sufficient durability for second layer 424 to meet or exceed the requirements of 180° bending of certain embodiments.

In at least one embodiment, port 432 is not associated with any embossments of first layer 424, such as the embossment forming living hinge 418.

While FIGS. 23A-D schematically illustrate forming load floor 412 using the blowmolding process including parison 450, it should be understood that the plastic shaping process could include, but is not limited to, a thermoforming process, a rotomolding process, and a rotocasting process. In the thermoforming process, parison 450 represents the first and second plastic layers of twin-sheet thermoforming process. In the rotomolding and rotocasted processes, parison 450 represents the molten plastic that has been coated onto the mold walls by centrifugal force during the rotational movement of the mold.

In at least one embodiment, load floor 412 is capable of supporting 0.1 to 0.5 lbf/in$^2$ when in-situ foam core 480 ranges from 1 inch to 4 inches thick and has a density ranging from 1.5 lbs/ft$^3$ to 6 lbs/ft$^3$ and wall 82 ranges from 0.025 inch thickness to 0.1 inch thickness. In another embodiment, load floor 12 is capable of supporting 0.3 to 0.45 lbf/in$^2$.

In at least a first aspect, load floor 12 includes load floor door 14 having living hinge 18, walls 82 and in-situ foam core 82 thermally bonded to walls 82. Wall 82 thickness ranges from 0.025 inches to 0.25 inches. In-situ foam core 80 density ranges from 1 lb/ft$^3$ to 5 lbs/ft$^3$. Associated with this first aspect, is capable of supporting 0.1 to 0.5 lbf/in$^2$ when in-situ foam core 80 ranges from 1 inch to 4 inches thick and has a density ranging from lbs/ft$^3$ to 6 lbs/ft$^3$ and wall 82 ranges from 0.025 inch thickness to 0.1 inch thickness.

Figure 24:
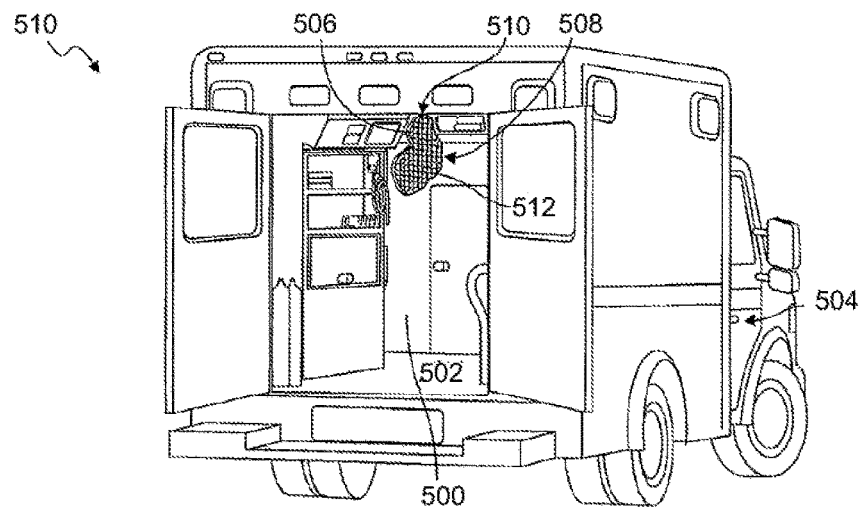
FIG. 24 schematically illustrates an isometric view of a vertical panel according to at least one embodiment.

Turning now to FIG. 24, vehicle 410 includes a vertical wall 500 dividing the vehicle back 502 from the front crew cab 104. Non-limiting examples of vehicle 410 include a type II ambulance, as schematically illustrated in FIG. 24, and a commercial delivery vehicle.

Vertical wall 500 includes a first skin 506 and second skin (not visible) 508 which forms a cavity 510 therebetween into which an in-situ foam core 512 has been injected and thermally bonded to skins 506 and 508.

Figure 25A:
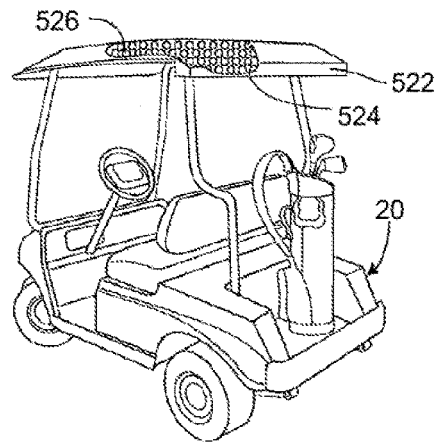
FIGS. 25A-25B schematically illustrate isometric views of panels according to another embodiment.

Turning now to FIG. 25A, a golf cart 520 includes a roof 522 having a skin 524 that envelops an in-situ foam core 526.

Figure 25B:
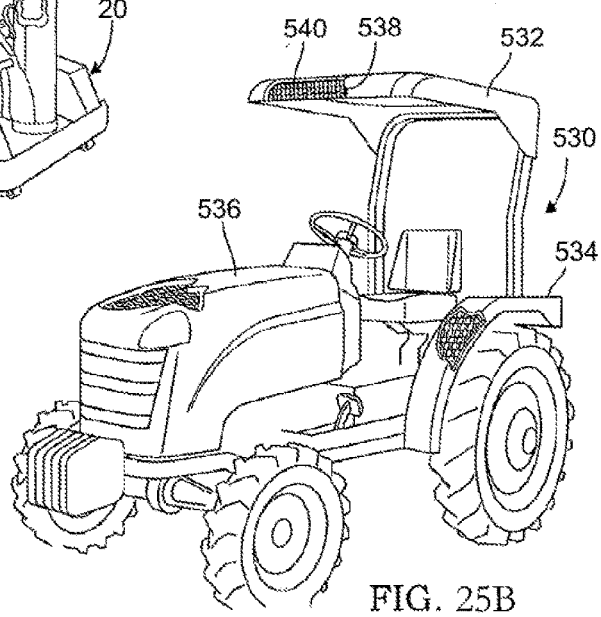

Turning now to FIG. 25B, a farm tractor 130 has component panels that include a roof 132, fenders 134 and an engine cover 136. Each panel includes a skin 138 which envelops and is thermally bonded to an in-situ foam core 140.

Figure 26A:
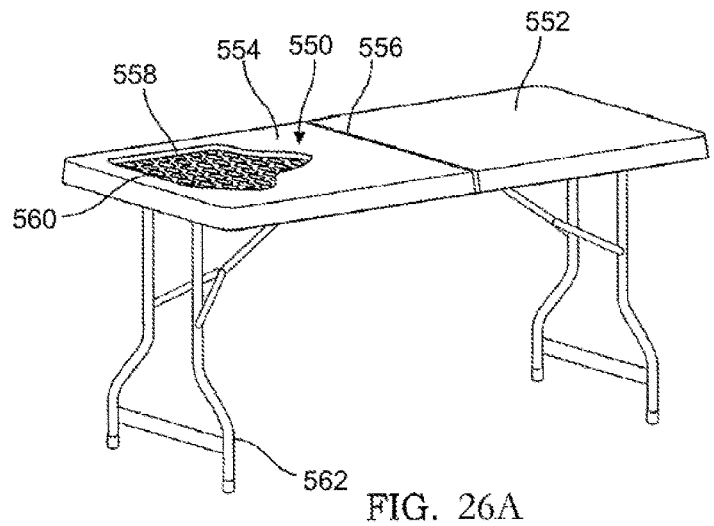
FIGS. 26A-26B schematically illustrate isometric views of panels according to another embodiment.

Turning now to FIG. 26A, a folding table 150 is schematically illustrated in at least one embodiment. Folding table 150 has a first panel 152, second panel 154 joined with a living hinge 156. Each panel includes a skin 158 thermally bonded to a in-situ foam core 160. In-situ foam core 160 and sufficient density so as to receive and retain bolts from a leg structure 162 with a bolt pull-out force in excess of 200 lbf/in of thread depth.

Figure 26B:
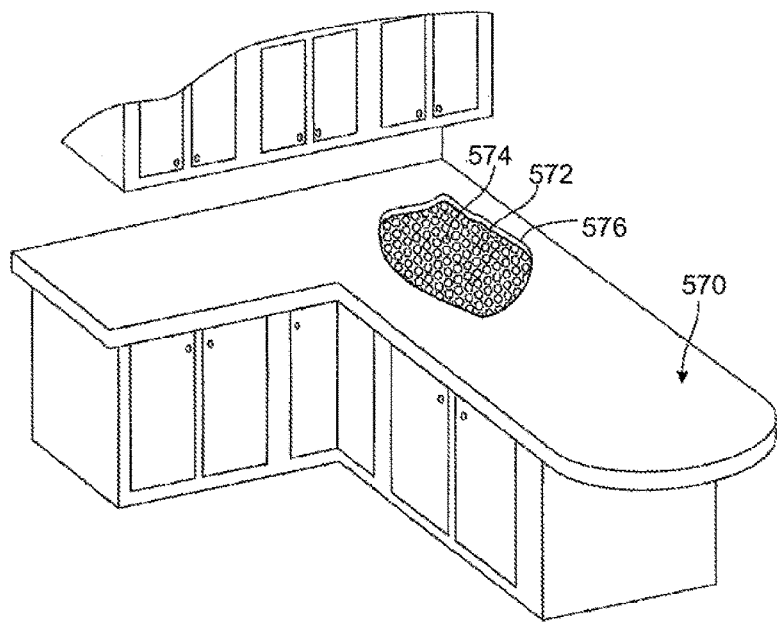

Turning now to FIG. 26B, a countertop 170 is schematically illustrated in at least one embodiment. countered top 170 includes a skin 172 thermally bonded to an in-situ molded core 174. Optionally, an aesthetic surface 176 may be bonded to skin 172. Non-limiting examples of aesthetic surface 176 include a laminate layer, a layer of ceramic composition, and a granite surface.

Turning now to FIG. 27A, a basketball backboard 180 is illustrated schematically according to one at least embodiment. Backboard 180 is a skin 182 thermally bonded to an in-situ foam core 184.

Turning now to FIG. 27B, a construction barricade 186 is schematically illustrated according to at least one embodiment. Barricade 186 includes a skin 188 thermally bonded to an in-in situ foam core 190.

Turning now to FIG. 27C, a scaffold 192 is schematically illustrated according to at least one embodiment. Scaffold 192 includes a panel 194 having a skin 196 thermally bonded to an in-situ foam core 198.

Figure 28A:
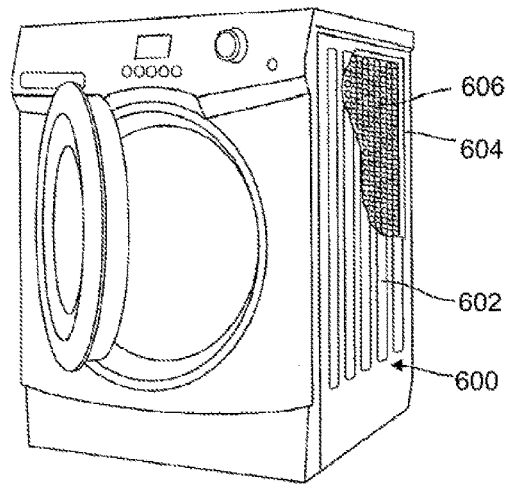
FIGS. 28A-28D schematically illustrate isometric views of panels according to another embodiment.

Turning now to FIG. 28A, a household or commercial appliance, such as a washing machine 200, is schematically illustrated according to at least one embodiment. Washing machine 200 includes at least one panel 202 having a skin 204 thermally bonded to an in-situ foam core 206. Having appliances with light weight panels, such as panel 202, is advantageous for installation ease. Appliances with panels such as panel 202 may also be made much quieter by adjusting the density of in-situ foam core 206 to match the sound spectrum of the appliance when operating. Panel 202, in at least one embodiment, has a sound transmission coefficient rating ranging from 25 to 40. In another embodiment, panel 202 as a sound transmission coefficient rating ranging from 30 to 38.

Figure 28B:
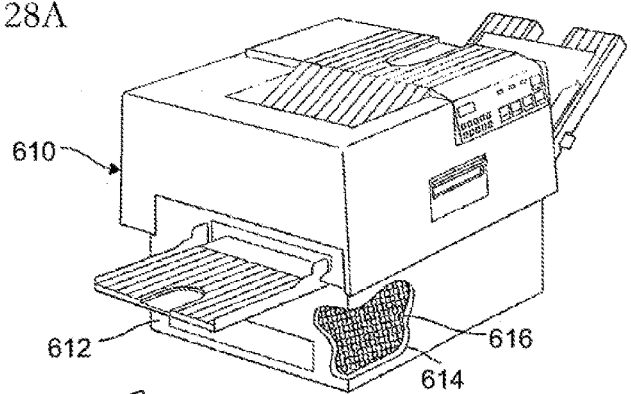

Turning now to FIG. 28B, a copier to 10 includes a kick plate 212 having a skin 214 thermally bonded to an in-situ foam core 216.

Figure 28C:
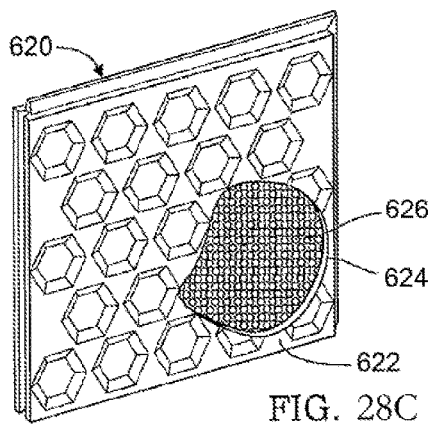

Turning now to FIG. 28C, the sound deadening wall panel 220, such as suitable for an anechoic chamber or a concert hall, includes an acoustic panel 222 having a skin 224 thermally bonded to an in-situ foam core 226.

Figure 28D:
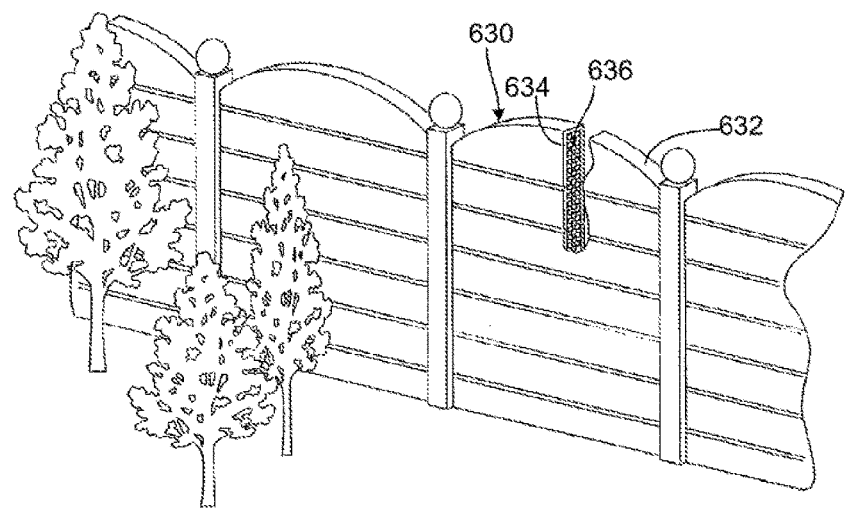

Turning now to FIG. 28D, a roadside sound barrier 230 includes a plurality of panels 232. Each panel has a skin 234 thermally bonded to an in-situ foam core 236. The density of in-situ foam core to 236 can be matched to specific frequencies of sound generated at particular stretches of road depending upon the road surface and the elevation of certain sources of sounds at various frequencies. For example, an asphalt road surface as a different spectrum of frequencies produced when run over by a car tire than does a concrete road surface. Tire-road surface frequencies are generally higher frequency and lower to the ground than frequencies generated by diesel truck exhaust systems and 8 to 10 feet above the ground. In addition, conventional concrete roadside sound barrier panels are 5 to 15 times heavier than the equivalent size roadside sound barrier 230. Roadside sound barrier 230 has the cost advantage of not requiring the use of heavy lifting equipment for installation. Further, roadside sound barrier 230 is not degraded by exposure to chloride from road salt applied to northern US roads during winter.

Figure 29:
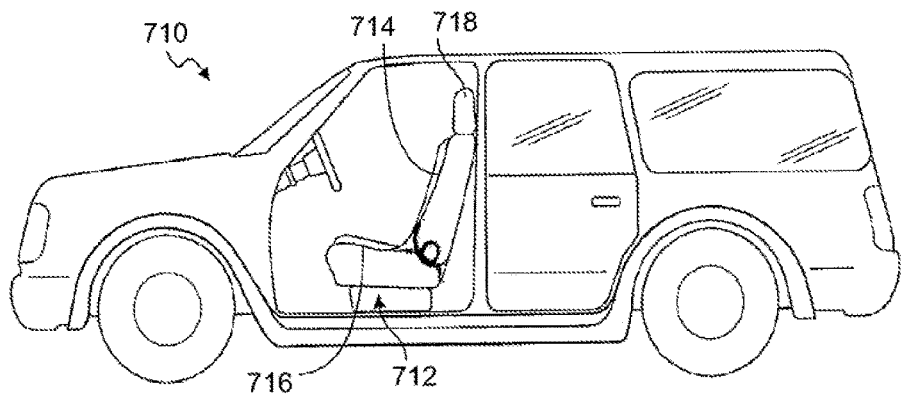
FIG. 29 schematically illustrates a vehicle having a seat assembly according to at least one embodiment.

FIG. 29 schematically illustrates a vehicle having a seat assembly according to at least one embodiment. A vehicle 710 has a seat assembly 712 including a seat back 714 and a seat base 716. Seat assembly 712 also includes a headrest 718.

Figure 30:
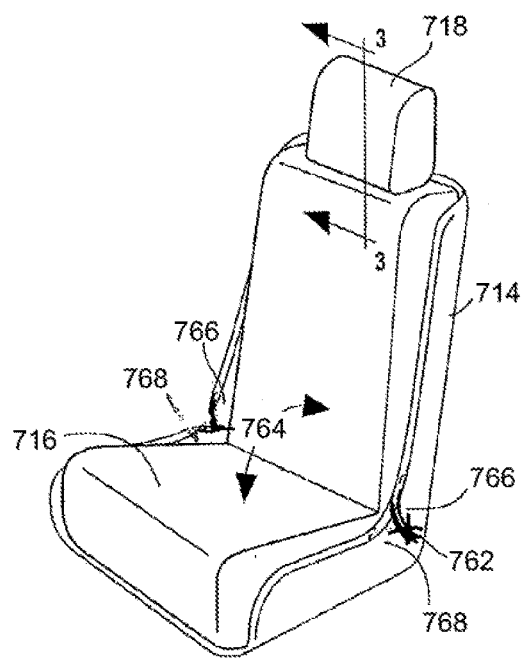
FIG. 30 schematically illustrates a seat back component and a headrest of a seat assembly according to at least one embodiment.

FIG. 30 schematically illustrates the seat back 714 pivotally attached to seat base 716 components and headrest 718 of seat assembly 712 according to at least one embodiment. Seat back 714 and seat base 716 include a skin 730 (see FIG. 31) and an in-situ foam core 732. In at least one embodiment, shown in FIG. 32 the seat back 714 and seat base 716 are a unified component where the skin 730 is formed by a plastic processing technique, such as blowmolding, injection molding, and/or thermoforming. In another embodiment, seat back 714 and seat base 716 are separate components with each skin 730 formed by plastic processing technique, such as blowmolding, injection molding, and/or thermoforming, that are assembled into a single unit. In at least one embodiment, seat back 714 and seat base 716 are adjacent at an R point 762, the theoretical hip point used in designing a seat when the seat is set in the rearmost and lowermost seating position. In at least one embodiment, seat back 714 and seat base 716 intersect at a seat back end at an angle 764 creating an obtuse angle ranging from 10° to 30° beyond a vertical intersection between seat back 714 and seat base 716. It is understood that seat back 714 and seat base 716 when these skins are formed separately may be formed by identical or different plastic processing techniques.

Figure 31:
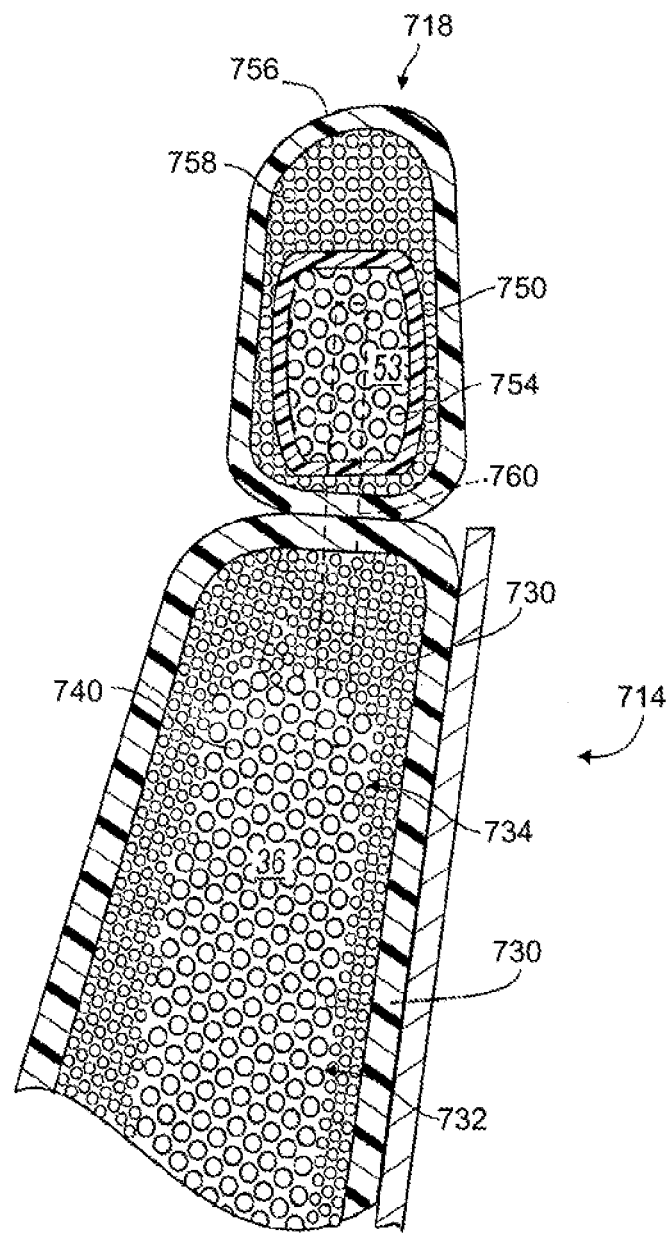
FIG. 31 schematically illustrates a fragmentary cross-sectional view of a seat back component and a headrest along axis 3-3 of FIG. 2 according to at least one embodiment.

FIG. 31 schematically illustrates a fragmentary cross-sectional view of seat back 714 component and headrest 718 along axis 3-3 of figure 730 according to at least one embodiment. Seat back 714 includes skin 730 which forms a cavity 736 into which in-situ foam core 732 is formed in at least one embodiment, the density of in-situ foam core 732 is of a single density. In another embodiment, in-situ foam core 732 is formed of pre-expanded beads 734 after they have been fully expanded and has a plurality of densities resulting from the use of a multiple sizes of pre-expanded beads. In-situ foam core 732 has a thermal bond to skin 730 during the expansion process. FIG. 31 schematically illustrates a higher density zone 738 and a lower density zone 740. It is advantageous to have a plurality of zones in order to tailor the necessary strength for the component as well as minimize use of materials and adding of weight. The thermal bond includes a portion of skin 730, a portion of in-situ foam core 732, and a co-mingled layer of a portion of skin 730 and a portion of in-situ foam core 732.

Headrest 7718, in at least one embodiment, includes a skin 750 formed by a plastic processing technique, such as blowmolding, injection molding, and/or thermoforming. Skin 750 forms a cavity 736 into which in-situ foam core 754 is injected Skin 570 and in-situ foam core 754 are covered with a cover stock material 756 in certain embodiments. A chemically-blown or a physically-blown foam is positioned between cover stock material 756 and skin 750 forming a non-structural, flexible compressive foam component. In another embodiment, skin 750 and in-situ foam core 754 are covered with chemically-blown or physically-blown foam which is then bagged and exposed to a vacuum. Cover stock material 56 is applied about the foam. A stiffening rod 760 is inserted into headrest 718 and is connectable to seat back 714, in at least one embodiment.

In at least one embodiment, skin 730 thickness may range from 0.03 inches to 0.5 inches. In another embodiment, the thickness of skin 730 may range from 0.05 inches to 0.25 inches.

In at least one embodiment, in-situ foam cores 732 and/or 754 thickness may range from 0.15 inches to 6 inches. In another embodiment, in situ foam core 732 and/or 754 thickness may range from 0.2 inches to 4 inches. In another embodiment, in-situ foam core 732 and/or 754 thickness may range from 0.5 inches to 1 inch.

Skins 730 and/or 750, in at least one embodiment, are formed of a composition of any moldable composition. Non-limiting examples of the composition include, but is not limited to, a liquid silicone rubber, a synthetic rubber, a natural rubber, a liquid crystal polymer, a synthetic polymer resin, and a natural polymer resin. In another embodiment, skins 730 and/or 750 are formed of a composition of a thermoplastic polymer, a thermoset polymer, or blends thereof having a viscosity ranging from 0.1 grams/10 min to 40 grams/10 min. The viscosity is measured according to ASTM D-1238 at 190° C. with a 2.16 kg weight. In yet another embodiment, skins 730 and/or 750 are formed of a composition of a polyolefin including polypropylene and polyethylene having a viscosity ranging from 1 grams/10 min to 30 grams/10 min.

In-situ foam core 732 and/or 754, in at least one embodiment, are formed of a composition of any fluid-expandable material. Examples of fluid-expandable material include, but are not limited to, a polyolefin polymer composition, a biopolymer expandable bead, an alkenyl aromatic polymer or copolymer, a vinyl aromatic polymer resin composition, and a polystyrene polymer composition. In at least one embodiment, the polyolefin polymer composition includes polyolefin homopolymers, such as low-density, medium-density, and high-density polyethylenes, isotactic polypropylene, and polybutylene-1, and copolymers of ethylene or polypropylene with other: polymerized bull monomers such as ethylene-propylene copolymer, and ethylene-vinyl acetate copolymer, and ethylene-acrylic acid copolymer, and ethylene-ethyl acrylate copolymer, and ethylene-vinyl chloride copolymer. These polyolefin resins may be used alone or in combination. Preferably, expanded polyethylene (EPE) particles, cross-linked expanded polyethylene (xEPE) particles, polyphenyloxide (PPO) particles, biomaterial particles, such as polylactic acid (PLA), and polystyrene particles are used. In at least one embodiment, the polyolefin polymer is a homopolymer providing increased strength relative to a copolymer. It is also understood that some of the particles may be unexpanded, also known as pre-puff, partially and/or wholly pre-expanded without exceeding the scope or spirit of the contemplated embodiments.

Pre-expanded bead 734, in at least one embodiment, is the resultant bead after raw bead has undergone a first expansion step of a two-step expansion process for beads. During the first expansion step, raw bead is expanded to 2% to 95% of the fully expanded bead size. The fully expanded bead is the bead that forms in-situ foam core 732. In another embodiment, pre-expanded bead 734 is result of the first expansion step where raw bead is expanded from 25% to 90% of the fully expanded bead size.

In at least one embodiment, pre-expanded bead 734 is re-compressed by 10 vol. % to 70 vol. % when being dispersed. Upon being dispersed, pre-expand bead 734 re-expands within the cavity 736.

A fluid for the second expansion step of the two-step expansion process for beads causes the pre-expanded beads to expand completely to form the fully expanded beads. Examples of the fluid include, but is not limited to, steam and superheated steam.

In at least one embodiment, in-situ foam core 32 density, after expansion by steam such a such as in FIG. 29, ranges from 0.2 lb/ft$^3$ to 20 lbs/ft$^3$. In at least one embodiment, in-situ foam core 32 density, after expansion by steam such as in FIG. 29, ranges from 1 lbs/ft$^3$ to 15 lbs/ft$^3$. In at least one embodiment, in-situ foam core 68 density, after expansion by steam such as in FIG. 29, ranges from 2 lbs/ft$^3$ to 9 lbs/ft$^3$. In at least one embodiment, in-situ foam core 68 density, after expansion by steam such as in FIG. 31, ranges from 3 lbs/ft$^3$ to 6 lbs/ft$^3$.

Preferably, in at least one embodiment, steam-injected expanded polypropylene (EPP) has a density ranging from 0.2 lb/ft$^3$ to 20 lbs/ft$^3$. In yet another embodiment, steam-injected EPP may have a density ranging from 1 lbs/ft$^3$ to 10 lbs/ft$^3$. In yet another embodiment, steam-injected EPP may have a density ranging from 2 lbs/ft$^3$ to 6 lbs/ft$^3$. In yet another embodiment, steam injected EPP may have a density ranging from 3 lbs/ft$^3$ to 5 lbs/ft$^3$.

A passenger vehicle seat assembly, such as seat assembly 712, having a skin 730 of a polyethylene composition having a thickness ranging between 0.025 inches and 0.25 inches with in-situ foam core 732 density ranging from 1 lb/ft$^3$ to 5 lbs/ft$^3$ formed of expanded polyethylene (EPE) that was expanded using steam, passes ECE 17 are surprisingly reducing weight by 5 to 15 pounds relative to a PC/ABS 60/40 composition equivalent passenger vehicle seat assembly. Also, the passenger vehicle seat assembly of this embodiment, reduces weight of the seat assembly by 2 to 7 pounds relative to the blowmolded polyethylene equivalent passenger vehicle seat assembly that preceded the PC/ABS composition seat assembly. That blowmolded polyethylene seat assembly failed to pass ECE 17 testing.

In at least one embodiment, a skin with a range 0.025 inch thickness to 0.1 inch thickness composed of a metallocene polypropylene was found to improve adhesion between skin 30 and in-situ foam core 732 formed of EPP.

In at least one embodiment, an extrusion rate of a blow-molding parison is increased so as to increase the skin 730 thickness at the R point 762 by a range of 25% greater thickness to 100% greater thickness within a band across opposite sides 66 and 68 of seat back 714 and/or seat base 716, respectively, nearest the R point 762 at a distance of 3 inches.

In at least one embodiment, skin 750 of a polyethylene composition having a thickness ranging between 0.025 inches and 0.1 inches with in-situ foam core 32 density ranging from 1 lb/ft$^3$ to 5 lbs/ft$^3$ formed of expanded polyethylene (EPE) that was expanded in using steam, passes ECE 17.

It is understood that headrest 718 may be a passive headrest, remaining stationary during rapid deceleration. The passive headrest may be configured to remain within 0.25 inches to 1 inch of a vehicle occupant's head when the occupant is in the normal seated posture. It is also understood that headrest 718 may be an active headrest also described as an active head restraint, which may include an airbag within the area between cover stock material 756 and skin 750. In another embodiment, the active head restraint may actively move forward during rapid deceleration or a rear-end collision.

While seat assembly 712 is illustrated as a first row seat assembly, it is understood that seat assembly 712 maybe suitable for second and third row seat or a 60/40 row seat width distribution assemblies, in certain embodiments. Further, while seat assembly 712 is illustrated is having a headrest 718, in certain embodiments, headrest 18 is optional.

In at least one embodiment, seat assembly 712 is configured is the 60/40 rear seat with foam core seat back 714 that experiences a maximum longitudinal displacement of the outermost point of 160 mm when compared to a conventional blowmolded seat back which experiences a maximum longitudinal displacement of 176 mm when tested according to ECE R17 regulation for the luggage retention with a 20 times the force of gravity crash pulse. In another embodiment, the foam core seat back 714 experiences a maximum longitudinal displacement of the outermost point of 145 mm when compared to a conventional blowmolded seat back. This means that the seat assembly 12 is passing ECE R17 test by 99.9 mm or approximately 80 rel. % to 99.9 rel. % of the specification. By comparison to conventional blow molded seat backs, the passing margin ranges from 32 rel. % to 52 rel. % better.

In at least one embodiment, seat back 714 deforms beyond a seat's H point plane by a maximum of less than 30 mm relative to a test's H plane maximum allowable deformation of 100 mm when tested according to ECE R17 regulation for luggage retention with a 20 times the force of gravity crash pulse. In at least one embodiment, seat back 714 deforms a maximum of less than 20 mm. In yet another embodiment, seat back 14 deforms a maximum of less than 5 mm. Surprisingly, in yet another embodiment, seat back 14 deforms a maximum of less than 1 mm.

In at least one embodiment, seat assembly 712 distributes input energy at least 10 to 20 ms faster than conventional blowmolded seat assemblies, when measured according to Federal Motor Vehicle Safety Standard (FMVSS) 202A deceleration energy absorption analysis E. In at least one embodiment, an entire deceleration of FMVSS202A deceleration energy absorption analysis E for seat back 14 is complete within 80 ms. In at least one embodiment, the deceleration of FMVSS202A deceleration energy absorption analysis E for seat back 14 is 95% complete within 70 ms. Surprisingly, in yet another embodiment, the deceleration of FMVSS202A deceleration energy absorption analysis E for seat back 14 is 95% complete within 60 ms. In another embodiment, seat assembly 712 distributes input energy at least 10 relative percent to 25 relative percent faster than conventional blowmolded seat assemblies.

Figure 32:
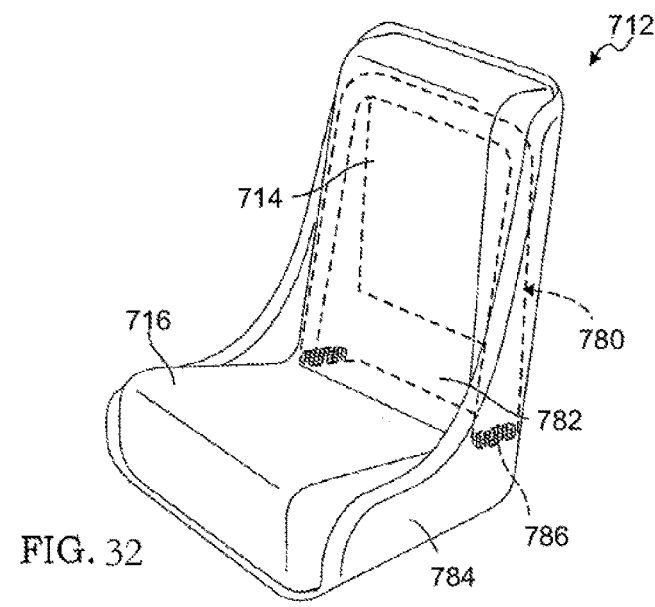
FIG. 32 schematically illustrates an isometric view of a seat assembly according to at least one embodiment.

In at least one embodiment, seat assembly 712 includes a wing 780 disposed along seat back 716 and intended to provide additional protection during crash pulses as schematically illustrated in at least one embodiment in FIG. 32. In at least one embodiment, the assembly 712 has a trim belt 782 disposed about a region of seat back 714 proximate to seat base 716 and the periphery of seat back 714. In at least one embodiment, trim belt 782 and wing 780 are unitized having a skin 784 including the thermal bond to an in-situ foam core 786.

Figure 33:
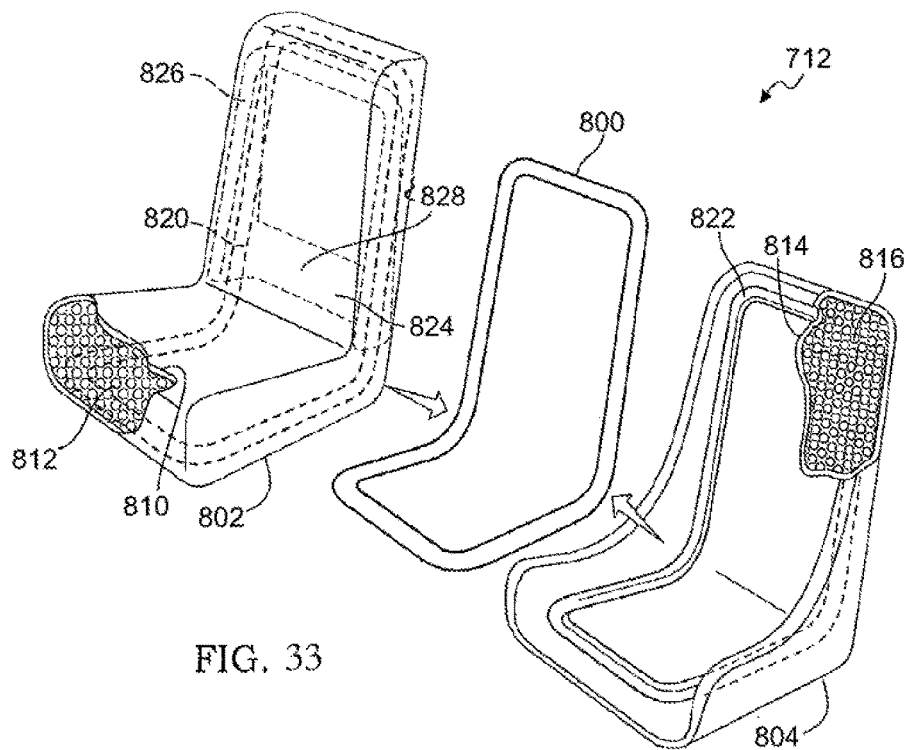
FIG. 33 schematically illustrates an exploded isometric view of a seat assembly according to another embodiment.

Turning now to FIG. 33, in at least one embodiment, seat assembly 712 includes a frame 800, a first seat component 802 and a second seat component 804. Seat component 802 includes a unitized molded component having a skin 810 and an in-situ foam core 812 including the thermal bond to skin 810. Second seat component 804 includes a unitized molded component having a skin 814 and an in-situ foam core 816 including the thermal bond to skin 814. In at least one embodiment, first seat component 802 includes a molded-in retention device 820 that cooperates with frame 800 to secure and/or position first seat component 802 on frame 800 during an assembly time period. Second seat component 804 includes a molded-in retention device 822 that cooperates with frame 800 to secure and/or position second seat component 822 on frame 800 adjacent to first seat component 802 during the assembly time period. It is understood that the assembly of first seat component 802 with frame 800 and second seat component 804 may be fastened together by means known in the art, such as, but not limited to, a screw 840, a bolt, and/or an adhesive.

Figure 34:
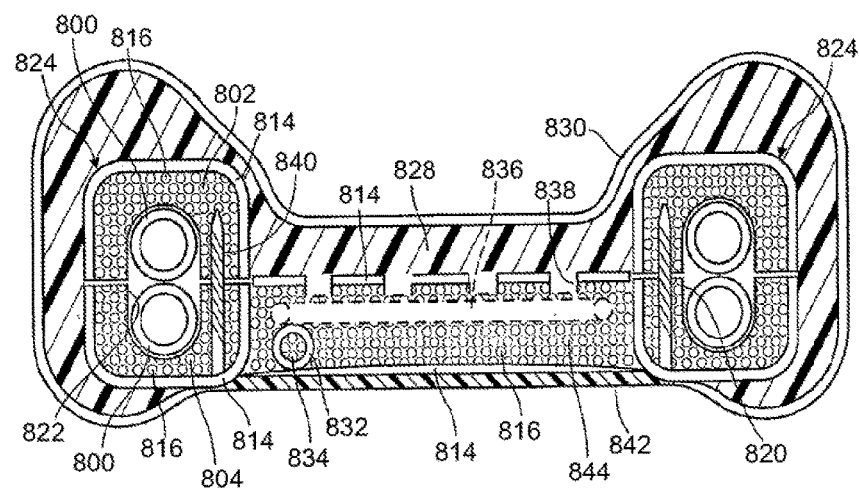
FIG. 34 schematically illustrates a cross-sectional view of a seat back assembly according to at least one embodiment.

It should be understood that while illustrated in FIG. 34 as a solid cross-section, the cross-section is contemplated such that, in at least one embodiment, first seat component 802 and/or second seat component 804 comprise an annular ring. In another embodiment, first seat component 802 and/or second seat component 804 include straps disposed between portions of the annular ring.

In at least one embodiment, a trim belt 824 is molded as part of the first seat component 802. Trim belt 824 is disposed about wings 826 and a lumbar spine support region 828. It is understood that cushioning components, such as a polyurethane foam 828 may be applied to at least one of first or second seating components 802 or 804, respectively. In addition, in certain embodiments, an aesthetic cover 830 may be applied to at least one of first or second seating components 802 or 804, respectively, disposed either directly on at least one of first or second seating components 802 or 804, respectively, or on cushioning components.

In at least one embodiment, second seat component 804 includes a central portion 844 disposed between portions of trim belt 824. Central portion 844 includes at least one accessory module such as a molded-in module like a wireway 832 for seat back wires 834, a seat back environmental temperature control conduit 836 that is adjacent to at least one seat back environmental temperature control embossments 838 for use in transmitting hot or cold air from the conduit 836 and from foam 828 and aesthetic over 830.

In at least one embodiment, a cover plate 842 is adjacent to central portion 844 providing an aesthetic over as well as, optionally, amenities, such as a map pocket (not shown).

It is understood that while FIG. 34 illustrates a unified seat back 814 and seat base in first seat component 802 and second seat component 804, segmented two piece seat with a separate seat back 814 and seat base 814 are contemplated. For a non-limiting example, seat back 814 can have its own first seat back component pivotally attached to the seat base and second seat back component, such as a head rest that is connected to the seat back frame in a conventional manner.

Figure 35:
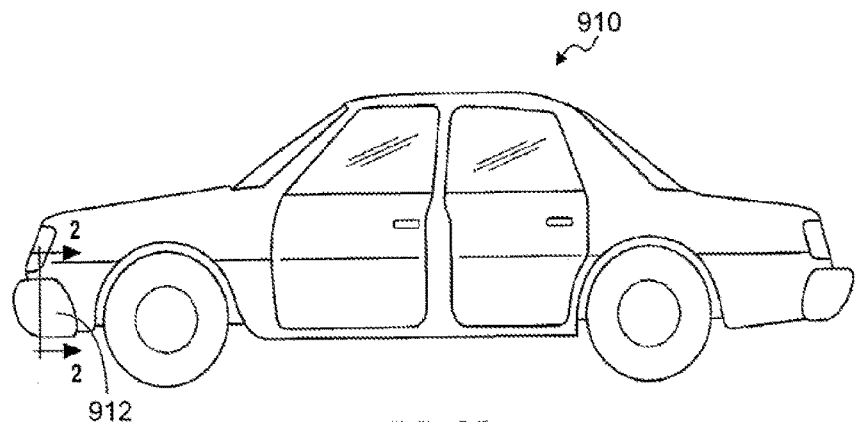
FIG. 35 schematically illustrates a vehicle having a structural bumper system according to at least one embodiment.

FIG. 35 schematically illustrates a vehicle 910 has an energy management system including a structural bumper system 912 for front and rear bumpers according to at least one embodiment.

Figure 36:
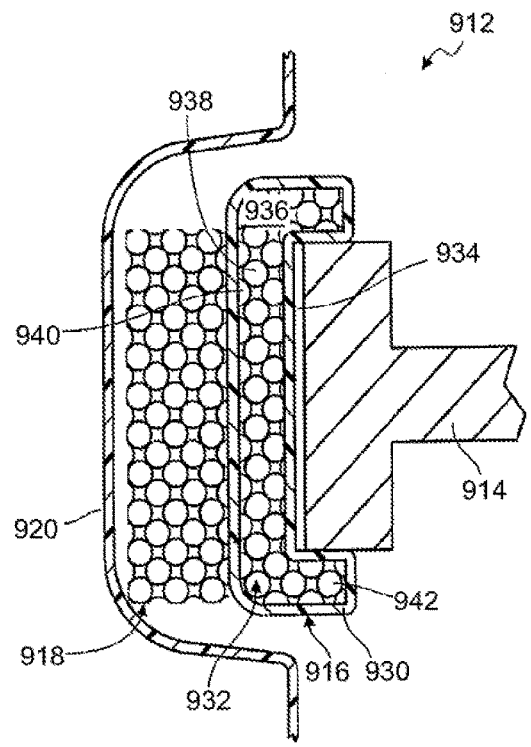
FIG. 36 schematically illustrates a fragmentary cross-sectional view of a structural bumper system along axis 2-2 of FIG. 1 according to at least one embodiment.

FIG. 36 schematically illustrates a fragmentary cross-sectional view of structural bumper system 912 along axis 2-2 of FIG. 35 according to at least one embodiment. Structural bumper system 912 includes a vehicle frame member 914, a structural plastic beam 916, an energy absorbing component 918, and a bumper fascia 920.

Structural plastic beam 916 includes a wall 930 having a thermal bond to an in-situ foam core 932. In at least one embodiment, the thermal bond includes the cooled connection of a molten or softened portion of wall 930, a molten or softened portion of in-situ foam core 932, and a co-mingled layer including portions of both wall 930 and core 932. Structural plastic beam 916 is connected to a vehicle frame member 914 with an adhesive layer 934 comprising an adhesive. It should be understood that any fastening method known in the art is suitable for connecting structural plastic beam 16 to vehicle frame member 914 without exceeding the scope or the spirit of the embodiments. Secured to structural plastic beam 916 is energy absorbing component 918. It should be understood that energy absorbing component 918 may be directly connected to structural plastic beam 916 or indirectly connected with optional layers of material and/or separation space being present. Connected to and/or spaced apart from energy absorbing component 918 is bumper fascia 920.

In at least one embodiment, the energy management system for vehicle 910 is capable of passing a 5-mph crash test according to a Federal Motor Vehicle Safety Standard 215 (FMVSS 215) Phase II specification. In another embodiment, the energy management system for vehicle 10 is capable of meeting the requirements of 49 CFR Part 581.5 when measured according to 49 CFR Part 581.6 and 581.7.

In-situ foam core 932 is prepared by injecting steam into pre-expanded beads dispensed into cavity 936 defined by wall 930. In at least one embodiment, at least two diameters of pre-expanded beads are dispensed into cavity 936 forming two zones 938 and 940 having different average densities of fully expanded beads 942 to comprise in-situ foam core 932. First zone 38 has relatively larger diameter beads of fully expanded beads than second zone 40. Therefore, the first zone 938 has a relatively lower average density than second zone 940. It is understood that while first zone 938 is illustrated as being disposed about structural plastic beam 916 neutral axis, first zone 938 may be disposed at any position within cavity 936. It is further understood that while two zones of different average densities are illustrated, there may be a plurality of zones of different densities without exceeding the scope or spirit of embodiments. It is yet further understood that the zones may be established in a relatively arbitrary manner such as delimiting zones along a gradient of average densities within the article.

In at least one embodiment, wall 30 thickness may range from 0.03 inches to 0.5 inches. In another embodiment, wall 30 thickness may range from 0.05 inches to 0.25 inches.

In at least one embodiment, in-situ foam core 32 thickness may range from 0.15 inches to 6 inches. In another embodiment, in-situ foam core 32 thickness may range from 0.2 inches to 4 inches. In another embodiment, in-situ foam core 32 thickness may range from 0.5 inches to 1 inch.

In at least one embodiment, the energy management system has weight and weighs less than 50 lbs. In another embodiment, the energy management system weight ranges from 10 to 40 lbs. In yet another embodiment, the energy management system weight ranges from 15 to 30 lbs.

Wall 30, in at least one embodiment, is formed of a composition of any moldable composition. Non-limiting examples of the composition include, but are not limited to, a liquid silicone rubber, a synthetic rubber, a natural rubber, a liquid crystal polymer, a synthetic polymer resin, and a natural polymer resin. In another embodiment, first and/or second layer 922 and 924, respectively, are formed of a composition of a thermoplastic polymer, a thermoset polymer, or blends thereof having a viscosity ranging from 0.1 grams/10 min to 40 grams/10 min. The viscosity is measured according to ASTM D-1238 at 190° C. with a 2.16 kg weight. In yet another embodiment, first and/or second layer 922 and 924, respectively, are formed of a composition of a polyolefin including polypropylene and polyethylene having a viscosity ranging from 1 grams/10 min to 30 grams/10 min.

In-situ foam core 32, in at least one embodiment, is formed of a composition of any fluid-expandable material. Examples of fluid-expandable material include, but are not limited to, a polyolefin polymer composition, a biopolymer expandable bead, an alkenyl aromatic polymer or copolymer, a vinyl aromatic polymer resin composition, and a polystyrene polymer composition. In at least one embodiment, the polyolefin polymer composition includes polyolefin homopolymers, such as low-density, medium-density, and high-density polyethylenes, isotactic polypropylene, and polybutylene-1, and copolymers of ethylene or polypropylene with other: polymerized bull monomers such as ethylene-propylene copolymer, and ethylene-vinyl acetate copolymer, and ethylene-acrylic acid copolymer, and ethylene-ethyl acrylate copolymer, and ethylene-vinyl chloride copolymer. These polyolefin resins may be used alone or in combination. Preferably, expanded polyethylene (EPE) particles, cross-linked expanded polyethylene (xEPE) particles, polyphenyloxide (PPO) particles, biomaterial particles, such as polylactic acid (PLA), and polystyrene particles are used. In at least one embodiment, the polyolefin polymer is a homopolymer providing increased strength relative to a copolymer. It is also understood that some of the particles may be unexpanded, also known as pre-puff, partially and/or wholly pre-expanded without exceeding the scope or spirit of the contemplated embodiments.

Pre-expanded beads, in at least one embodiment, are the resultant beads after raw beads have undergone a first expansion step of a two-step expansion process for beads. During the first expansion step, raw bead is expanded to 2% to 95% of the fully expanded bead size. The fully expanded bead is the bead that forms in-situ foam core 926. In another embodiment, pre-expanded bead is result of the first expansion step where raw beads are expanded from 25% to 90% of the fully-expanded beads 942 size. It is understood that pre-expanded beads may be partially recompressed during introduction to cavity 936, if the introduction process occurs under pressure. In at least one embodiment, introduction process pressure ranges from 5 $lbf/in^2$ above ambient to 50 $lbf/in^2$ above ambient. In at least one embodiment, introduction process pressure ranges from 15 $lbf/in^2$ above ambient to 35 $lbf/in^2$ above ambient.

A fluid for the second expansion step of the two-step expansion process for beads causes the pre-expanded beads to expand completely to form the fully expanded beads. Examples of the fluid include, but are not limited to, steam and superheated steam.

Polyolefin beads and methods of manufacture of pre-expanded polyolefin beads suitable for making the illustrated embodiments are described in Japanese patents JP60090744, JP59210954, JP59155443, JP58213028, and U.S. Pat. No. 4,840,973 all of which are incorporated herein by reference. Non-limiting examples of expanded polyolefins are ARPLANK® and ARPRO® available from JSP, Inc. (Madison Heights, Mich.). The expanded polypropylene, such as the JSP ARPRO™ EPP, has no external wall such as energy absorbing component 918.

In at least one embodiment, in-situ foam 932 core has a density, after expansion by steam such a such, ranges from 1 $lb/ft^3$ to 25 $lbs/ft^3$. In at least one embodiment, in-situ foam core 32 density, after expansion by steam, ranges from 1.5 $lbs/ft^3$ to 15 $lbs/ft^3$. In at least one embodiment, in-situ foam core 32 density, after expansion by steam, ranges from 2 $lbs/ft^3$ to 9 $lbs/ft^3$. In at least one embodiment, in-situ foam core 932 has density, after expansion by steam, ranges from 3 $lbs/ft^3$ to 6 $lbs/ft^3$.

Preferably, in at least one embodiment, structural plastic beam 916 is comprised of steam-injected expanded polypropylene (EPP) has a density ranging from 1 $lb/ft^3$ to 20 $lbs/ft^3$. In yet another embodiment, steam-injected EPP may have a density ranging from 1.5 $lbs/ft^3$ to 10 $lbs/ft^3$. In yet another embodiment, steam-injected EPP may have a density ranging from 2 $lbs/ft^3$ to 6 $lbs/ft^3$. In yet another embodiment, steam-injected EPP may have a density ranging from 3 $lbs/ft^3$ to 5 $lbs/ft^3$. In at least one embodiment, structural plastic beam 16 and structural bumper system 912 pass the 5-mph crash test and are recyclable.

In at least one embodiment, wall 930 with a range of 0.025 inch thickness to 0.1 inch thickness is comprised of a metallocene polypropylene. Such a combination is found to improve adhesion between wall 930 and in-situ foam core 932 formed of EPP.

Turning now to FIGS. 37A-37G, a method of manufacture of a structural bumper system according to at least one embodiment is schematically illustrated in fragmentary cross-sectional views. In FIG. 37A a first mold portion 980 and a second mold portion 982 are spaced about a polymeric parison 984 as part of a blowmolding process. First mold portion 980 has a port 986 suitable for use with injection devices.

FIG. 37B schematically illustrates closing of first mold portion 980 with second mold portion 982 pinching polymeric parison 984 between them. Polymeric parison 984 forms walls 988 of an energy management component 990 and defining a cavity 992.

In FIG. 37C, a drill bit 1000 enters port 986 and drills through a portion of wall 988 opening an aperture 1002 into cavity 992. Drill bit 1000 withdraws from port 986 and a bead dispenser 1004 enters port 986. A valve 1006 opens allowing a plurality of pre-expanded beads 1008 from a bead source 1010 to enter cavity 992. Bead dispenser 104 withdraws from port 986 and steam pin 1012 and steam vent 1014 enter port 986 in FIG. 37D. Steam pin 1012 further enters cavity 992 and into pre-expanded beads 1008. A valve 1016 of a steam source 1018 opens allowing steam and/or superheated steam to enter cavity 992 causing expansion of pre-expanded beads 1008 forming fully expanded beads. Residual steam exits through steam vent 1014.

In FIG. 37E, fully expanded beads form an in-situ foamed core 1020 which is bonded thermally to walls 988. First mold portion 980 moves away from second mold portion 982 and wall 988 forming a gap 1022. Bead dispenser 1004 enters port 986. A valve 1006 opens dispensing pre-expanded beads 1008 into gap 1022. Bead dispenser 104 withdraws from port 986.

In FIG. 37F, first mold portion 980 closes, thereby compacting pre-expanded beads 1008 in gap 1022. Steam pin 1012 and steam vent 1014 enter port 986 and inject steam into compressed pre-expanded beads 1008 in gap 1022 causing expansion of pre-expanded beads 1008 in 1022 forming fully expanded beads. The full expanded beads comprise an energy absorbing component 918 thermally bonded to wall 988 of structural plastic beam 16 where wall 988 encompasses in-situ foamed core 1020.

It should be understood that while a single bead source 1010 is illustrated in steps 37C and 3E, a plurality of bead sources could be used, with each bead source having identical or different diameter beads of identical or different composition. It is also understood that while a single steam source 118 is illustrated in steps 37D and 37F, a plurality of steam sources may be used with each steam source having identical or different compositions of fluids, such as steam and superheated steam.

Figure 38:
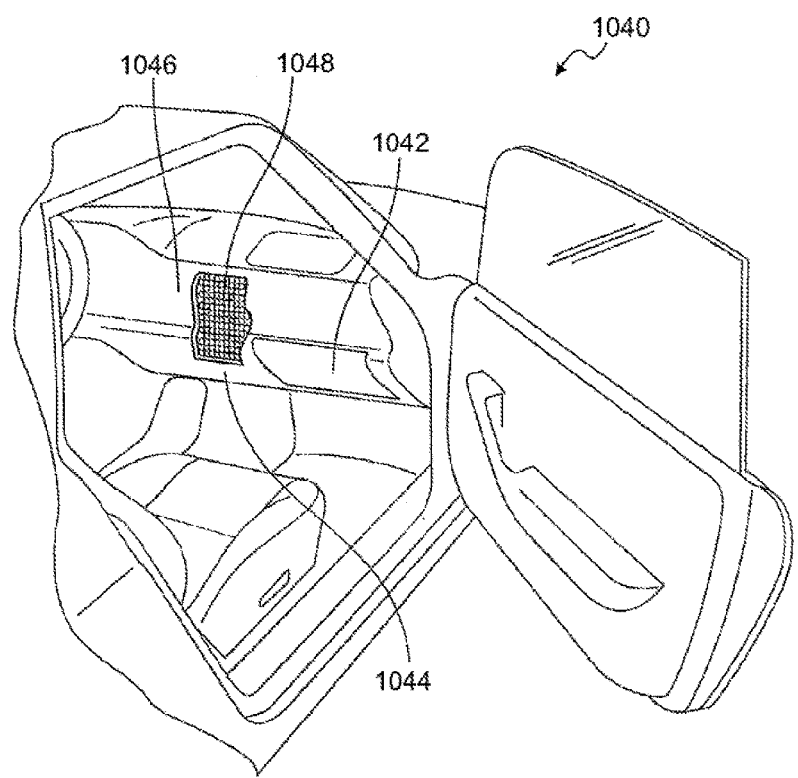
FIG. 38 schematically illustrates energy management components according to at least one embodiment.

Turning now to FIG. 38 a vehicle 1040 is illustrated schematically according to at least one embodiment. A glovebox 1042 and a knee bolster 1044 include a scheme 0146 thermally bonded to an in-situ foam core 1048. The density of in-in situ foamed core 1048 assists in energy management of an impact with the area of the dashboard containing glovebox 1042 and knee bolster 144.

It should be understood that other embodiments may use a heating medium other than steam without exceeding the scope of contemplated embodiments. It is further understood that the expanded polyolefin may be formed using a heating medium in cooperation with a blowing agent, such as pertane.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle seating system having a plastic structural article comprising:
    an elongated tubular plastic shell formed with thermoplastic polymer having opposed end sections, a middle section therebetween and a hollow interior cavity; and
    a foam core comprising steam expandable thermoplastic polymer beads which when expanded substantially fills the interior cavity and is thermally bonded to the shell;
    wherein the thermoplastic polymer forming the plastic shell and the expandable thermoplastic polymer beads are both selected from one of the group of: polypropylene, polystyrene polyethylene, a thermoplastic/polyolefin/polypropylene blend, a thermoplastic elastomer/polyolefin blend, a thermoplastic vulcanizate/polyolefin blend and a heterogeneous polymer blend, thereby enabling the article to be reground and recycled without necessitating separating the shell and core materials;
    wherein the plastic structural article forms a structural first seat component having a skin having a thermal bond to an in-situ foam core, wherein the first seat component maximum displacement is less than 160 mm when tested according to a test method in an ECE R17 regulation, circa Mar. 28, 2012, for luggage retention with a crash force pulse of 20 times the force of gravity.

2. The vehicle seating system 1, wherein the first seat component is a seat back.

3. The seating system of claim 1, wherein the in-situ foam is comprised of expanded polypropylene having a density ranging from 1.5 lbs/ft3 to 10 lbs/ft3.

4. The seating system of claim 1, wherein the plastic shell is comprised of a metallocene polypropylene composition or a homopolymer and polypropylene composition.

5. A seating system for use with a vehicle having a seat with an H point plane, the system having a plurality of plastic structural articles each comprising:
    an elongated tubular plastic shell formed with thermoplastic polymer having opposed end sections, a middle section therebetween and a hollow interior cavity; and
    a foam core comprising steam expandable thermoplastic polymer beads which when expanded substantially fills the interior cavity and is thermally bonded to the shell;
    wherein the thermoplastic polymer forming the plastic shell and the expandable thermoplastic polymer beads are both selected from one of the group of: polypropylene, polystyrene polyethylene, a thermoplastic/polyolefin/polypropylene blend, a thermoplastic elastomer/polyolefin blend, a thermoplastic vulcanizate/polyolefin blend and a heterogeneous polymer blend, thereby enabling the article to be reground and recycled without necessitating separating the shell and core materials; wherein the plastic structural articles form:
        a first seat back component portion having a skin having a thermal bond to an in-situ foam core and a periphery; and
        a second seat back component portion having a skin having a thermal bond to an in-situ foam core and a periphery;
    wherein the first seat back component portion and the second seat back component portion are attachable to one another to connect to a seat frame.

6. The seating system of claim 5, wherein at least one of the first or second seat back components includes a channel providing an air duct to heat or cool the seating system.

7. The seating system of claim 5, wherein the first and second in-situ foam cores are comprised of expanded polypropylene having a density ranging from 1.5 lbs/ft3 to 10 lbs/ft3.

8. The seating system of claim 5, wherein the plastic shell is comprised of a metallocene polypropylene composition or a homopolymer and polypropylene composition.

9. The seating system of claim 5, wherein at least one of the first or second seat back components includes a central portion situated between the periphery, the central portion including an aperture sized to receive an accessory module.

10. The seating system of claim 9, wherein maximum seat back deformation beyond the seat's H point plane is less than 30 mm relative to a test's H point plane when tested according to the ECE R17 regulation, circa Mar. 28, 2012, for luggage retention with a crash force pulse of 20 times the force of gravity.

11. The seating system of claim 10, wherein seat back deceleration measured using FMVSS202A, circa Mar. 28, 2012, deceleration energy absorption analysis E, is 95% complete within 70 ms.

* * * * *

UNITED STATES PATENT AND TRADEMARK OFFICE
CERTIFICATE OF CORRECTION

| | | |
|---|---|---|
| PATENT NO. | : 10,207,606 B2 | Page 1 of 1 |
| APPLICATION NO. | : 14/389019 | |
| DATED | : February 19, 2019 | |
| INVENTOR(S) | : Roberts | |

It is certified that error appears in the above-identified patent and that said Letters Patent is hereby corrected as shown below:

In the Specification

Column 1, Lines 13-14:
After "filed March 28, 2012"
Delete "and claims priority to" and
Insert --is a continuation-in-part of--

Signed and Sealed this
Sixth Day of August, 2019

Andrei Iancu
*Director of the United States Patent and Trademark Office*